Figure 26:
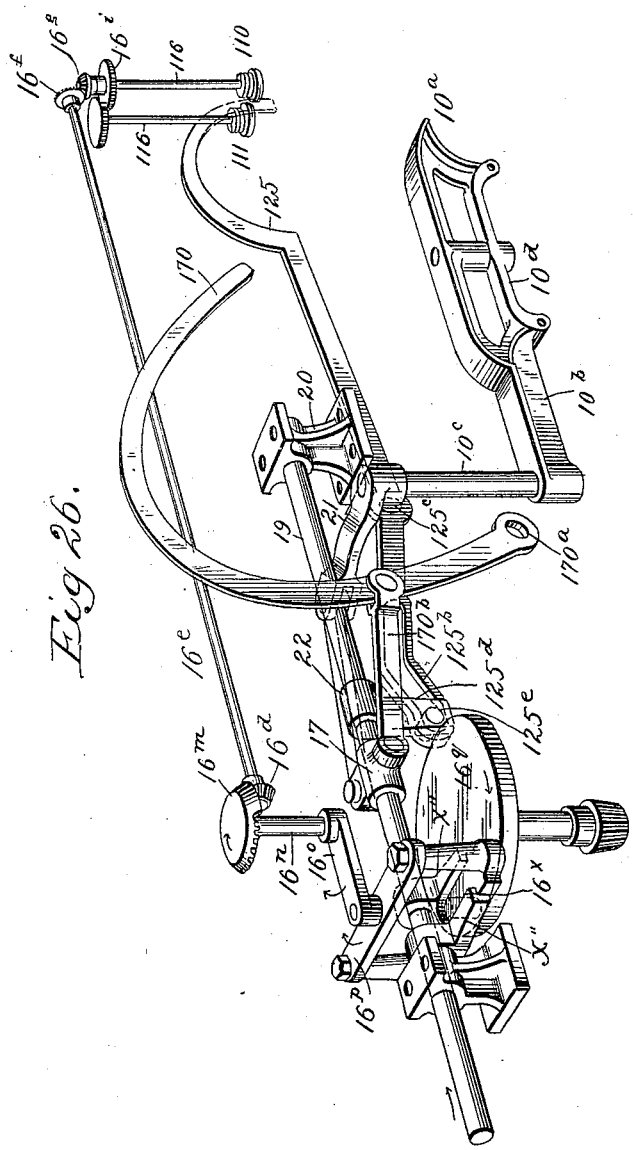

No. 635,725. Patented Oct. 24, 1899.
E. HORTON.
BASKET MAKING MACHINE.
(Application filed Aug. 8, 1898.)
(No Model.) 15 Sheets—Sheet 1.
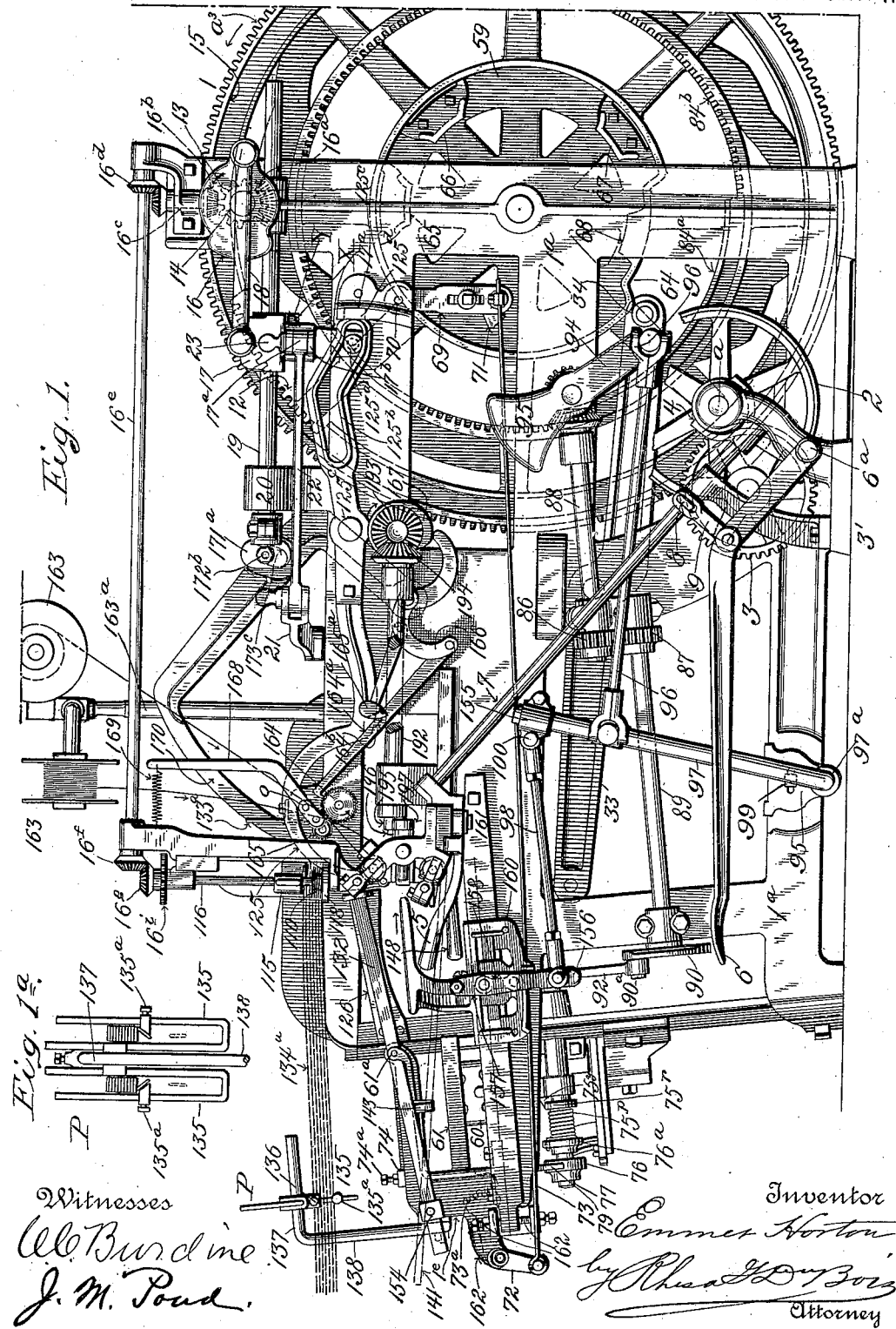

No. 635,725. Patented Oct. 24, 1899.
E. HORTON.
BASKET MAKING MACHINE.
(Application filed Aug. 8, 1898.)
(No Model.) 15 Sheets—Sheet 2.
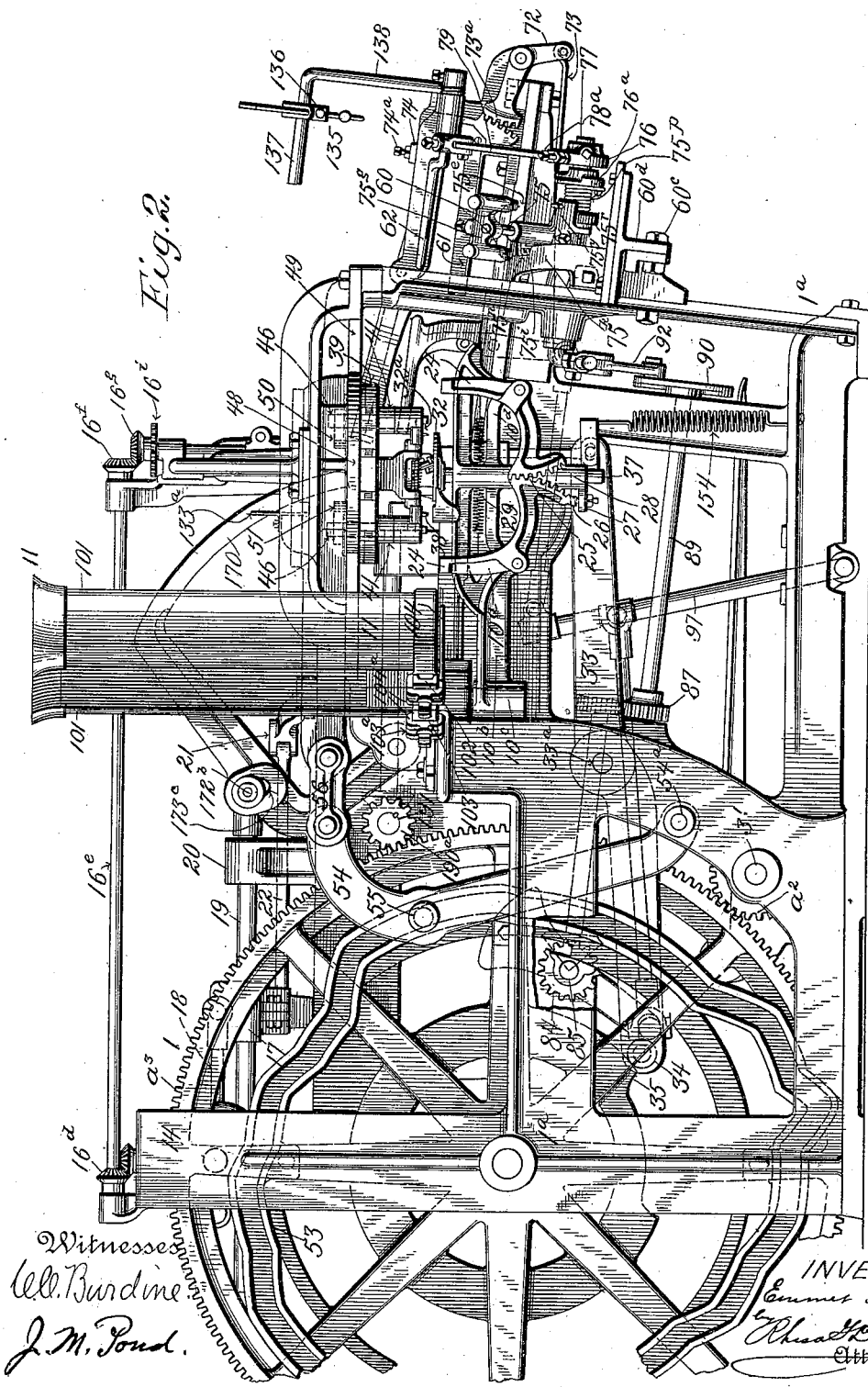

No. 635,725. Patented Oct. 24, 1899.
E. HORTON.
BASKET MAKING MACHINE.
(Application filed Aug. 8, 1898.)
(No Model.) 15 Sheets—Sheet 3.
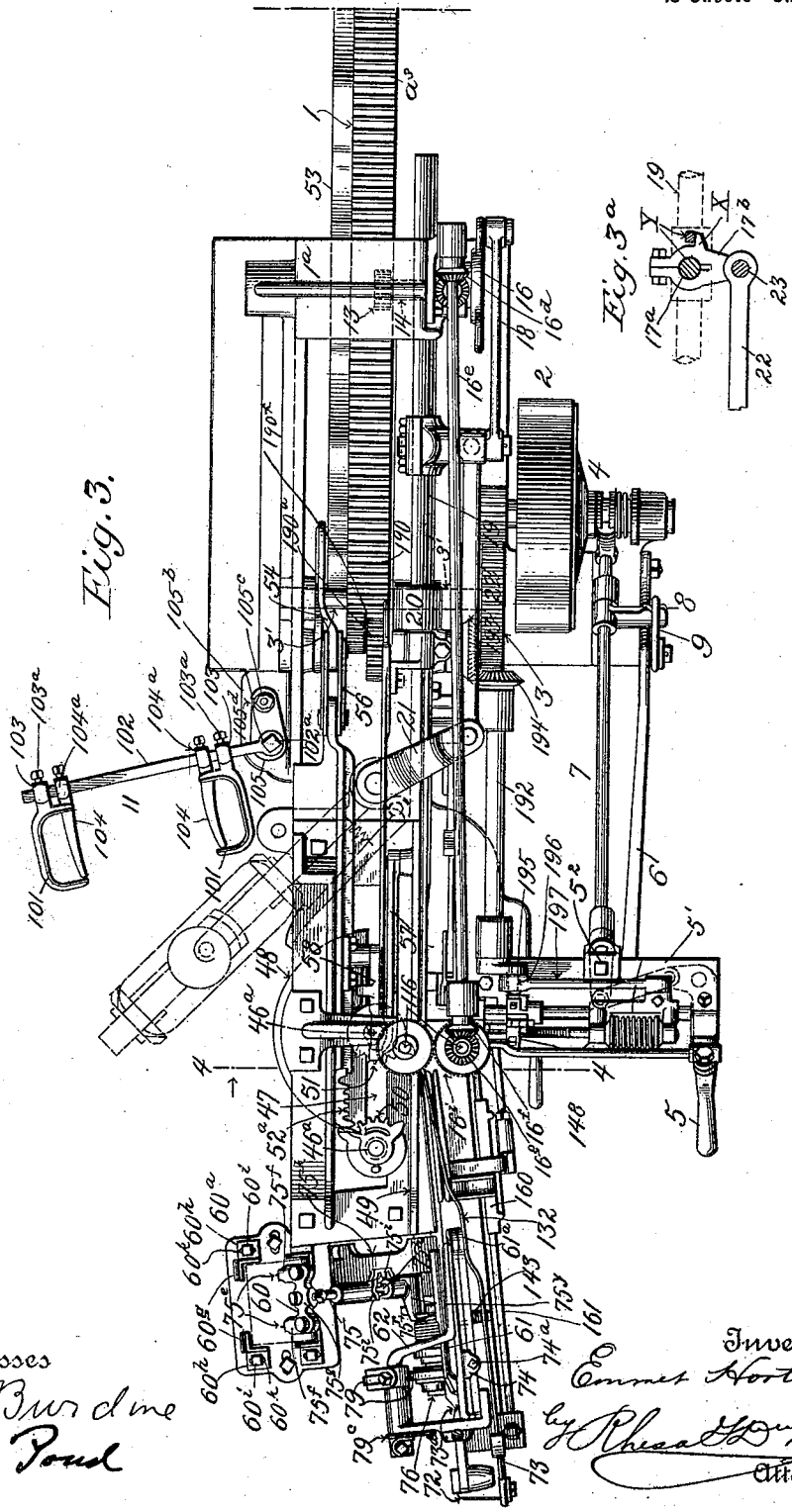
Witnesses
Inventor
Attorney
THE NORRIS PETERS CO., PHOTO-LITHO., WASHINGTON, D. C.

No. 635,725. Patented Oct. 24, 1899.
E. HORTON.
BASKET MAKING MACHINE.
(Application filed Aug. 8, 1898.)
(No Model.) 15 Sheets—Sheet 4.
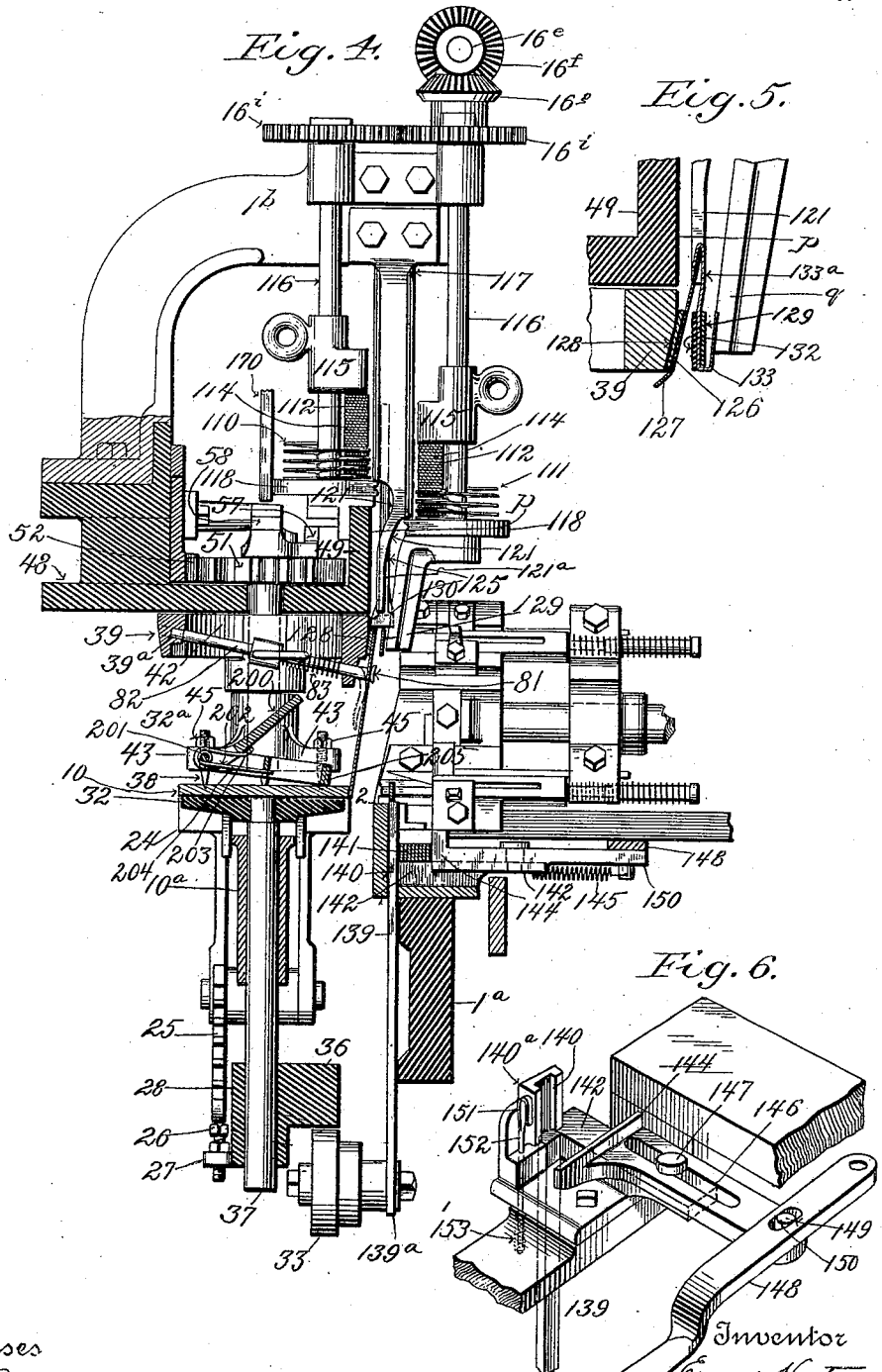

No. 635,725. Patented Oct. 24, 1899.
E. HORTON.
BASKET MAKING MACHINE.
(Application filed Aug. 8, 1898.)
(No Model.) 15 Sheets—Sheet 5.
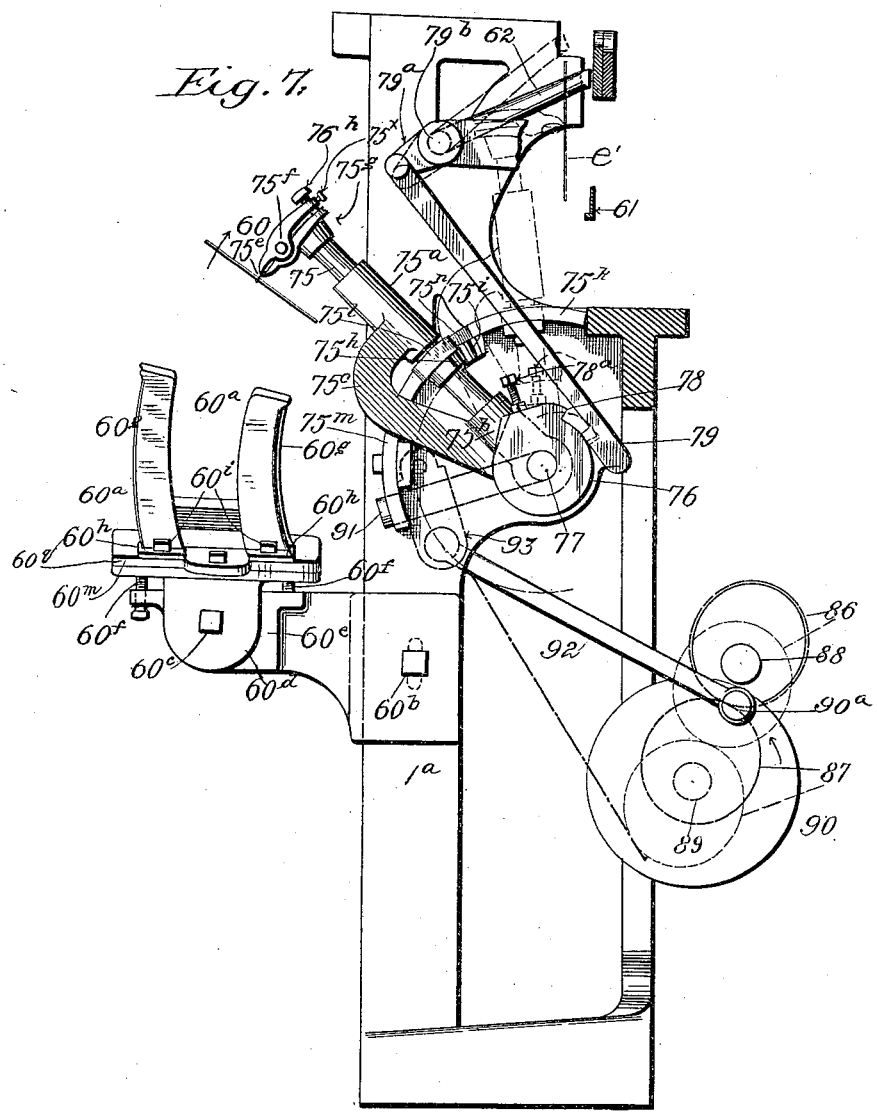
Witnesses
Inventor
Emmet Horton
Attorney No. 635,725.  
Patented Oct. 24, 1899.
E. HORTON.
BASKET MAKING MACHINE.
(Application filed Aug. 8, 1898.)
(No Model.)
15 Sheets—Sheet 6.
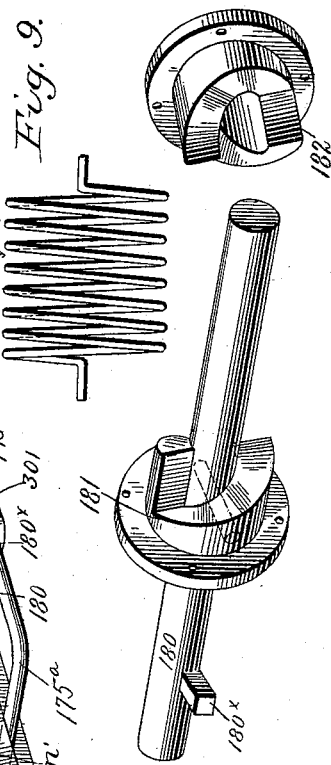
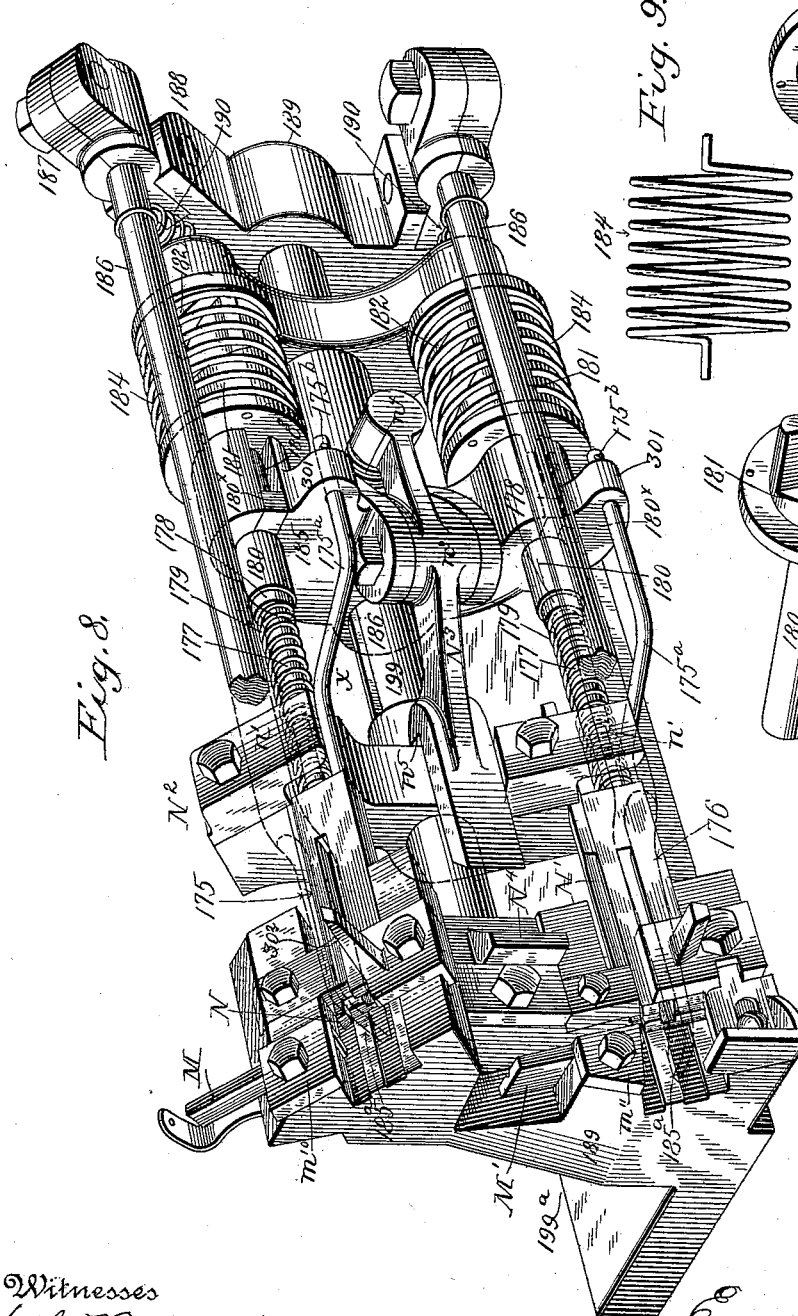
Witnesses  
Inventor  
Attorney No. 635,725. Patented Oct. 24, 1899.
E. HORTON.
BASKET MAKING MACHINE.
(Application filed Aug. 8, 1898.)
(No Model.) 15 Sheets—Sheet 7.
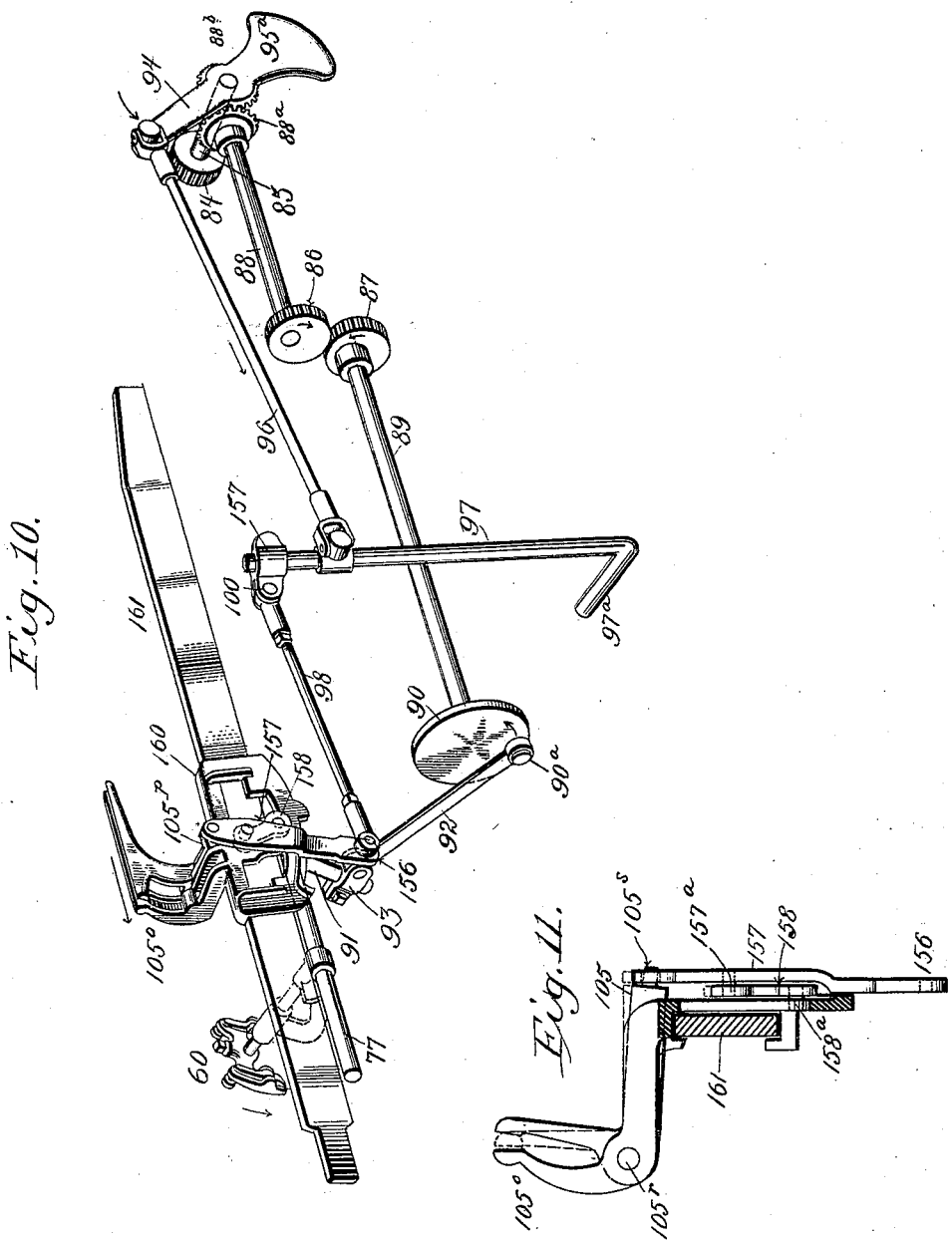
Witnesses
W. C. Burdine.
J. M. Pond.
Inventor
Emmet Horton
by Rhesa G. D. Borg
Attorney No. 635,725. Patented Oct. 24, 1899.
E. HORTON.
BASKET MAKING MACHINE.
(Application filed Aug. 8, 1898.)
(No Model.) 15 Sheets—Sheet 8.
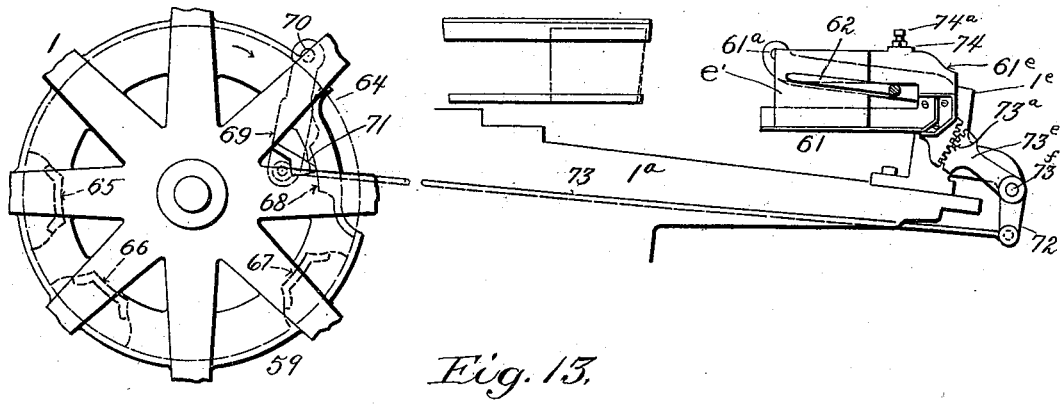
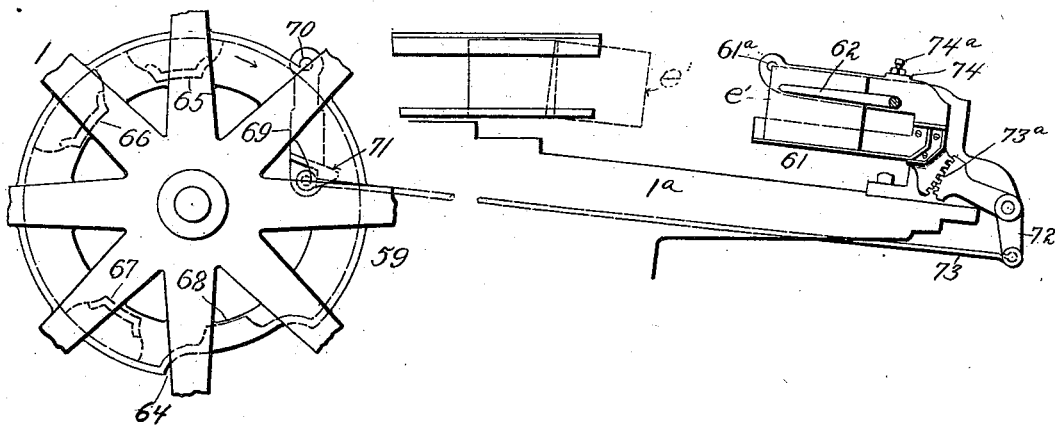
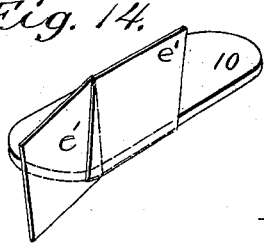
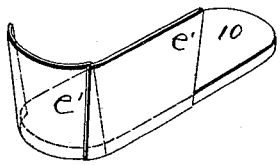
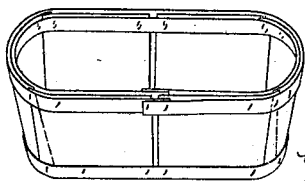
Witnesses
Inventor
Emmes Horton
Attorney No. 635,725. Patented Oct. 24, 1899.
E. HORTON.
BASKET MAKING MACHINE.
(Application filed Aug. 8, 1898.)
(No Model.) 15 Sheets—Sheet 9.
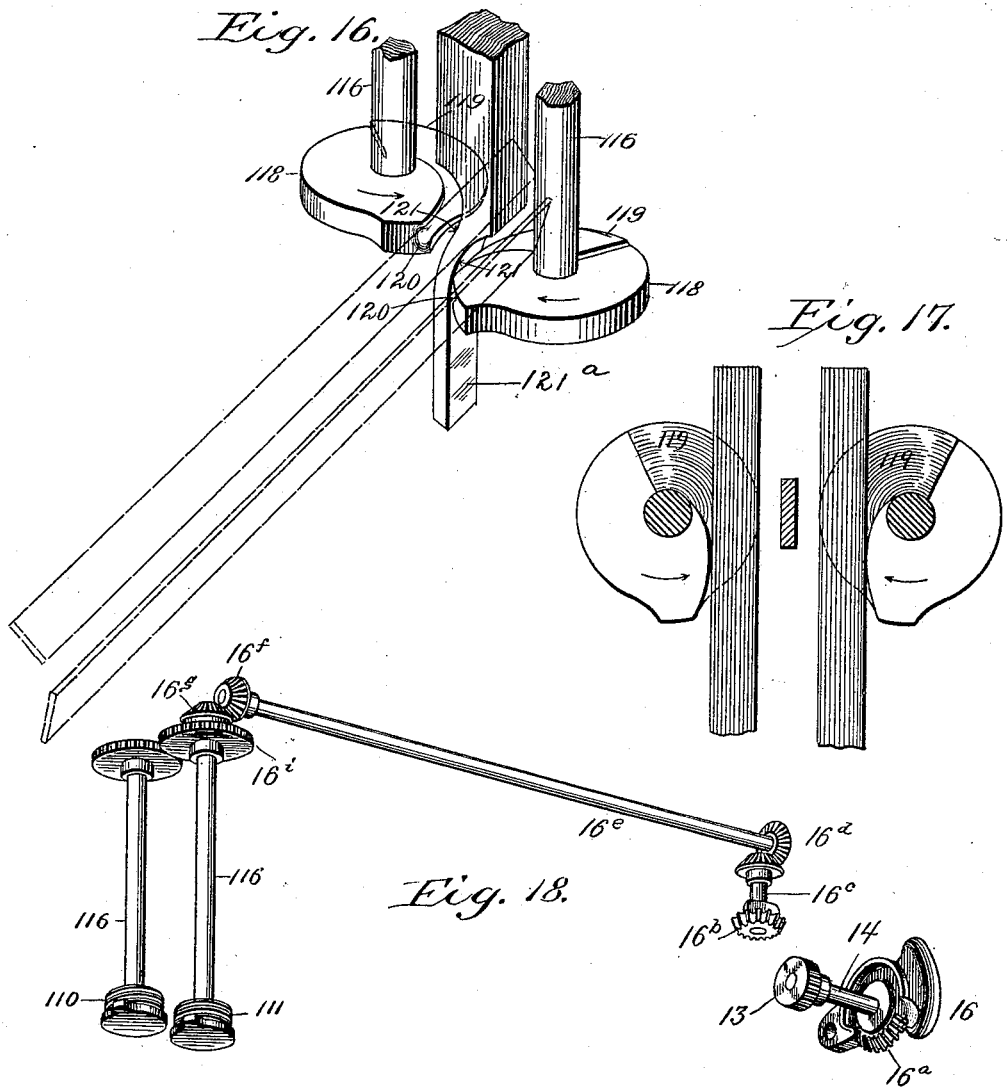
Witnesses
Inventor
Emmet Horton
Attorney No. 635,725. Patented Oct. 24, 1899.
E. HORTON.
BASKET MAKING MACHINE.
(Application filed Aug. 8, 1898.)
(No Model.) 15 Sheets—Sheet 10.
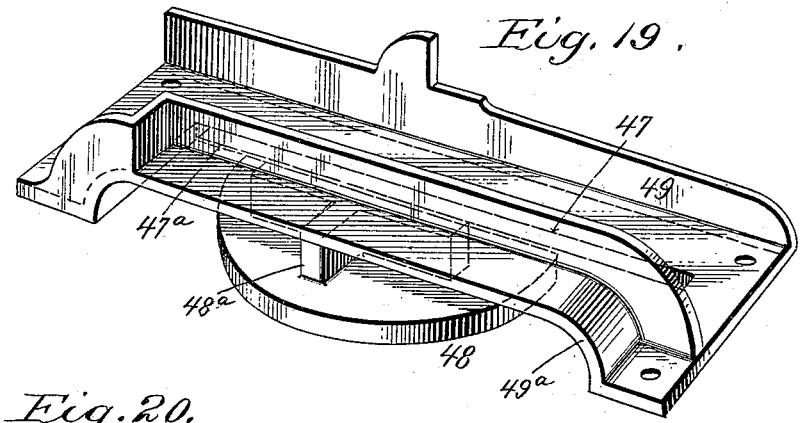
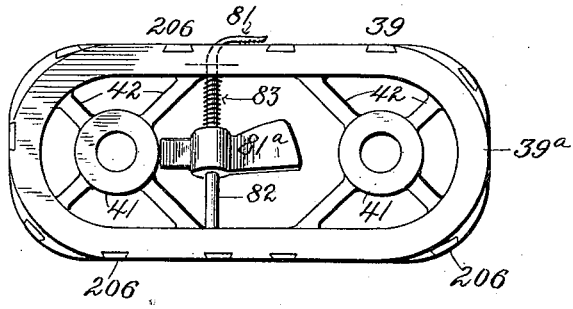
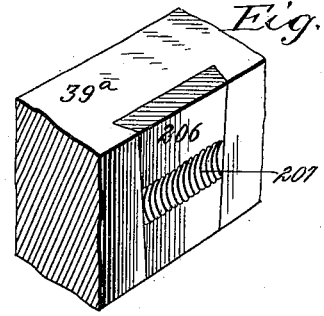
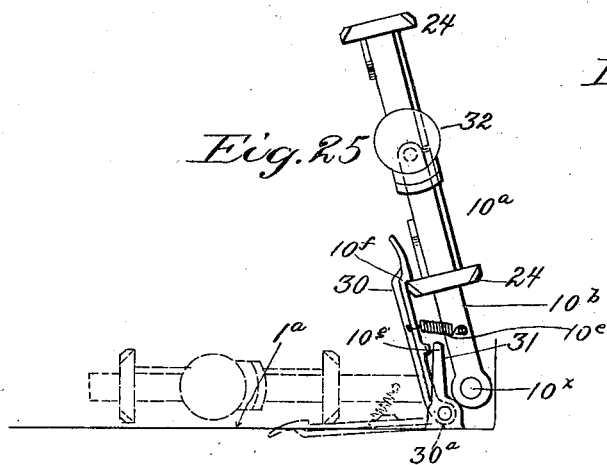
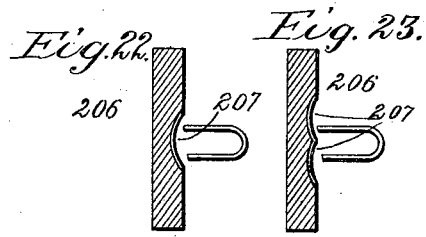
Witnesses
Inventor
Emmet Horton
Attorney No. 635,725. Patented Oct. 24, 1899.
E. HORTON.
BASKET MAKING MACHINE.
(Application filed Aug. 8, 1898.)
(No Model.) 15 Sheets—Sheet 11.

Witnesses

Inventor
Emmet Horton
by Rhea G. DuBois
Attorney

No. 635,725. Patented Oct. 24, 1899.
E. HORTON.
BASKET MAKING MACHINE.
(Application filed Aug. 8, 1898.)
(No Model.) 15 Sheets—Sheet 12.
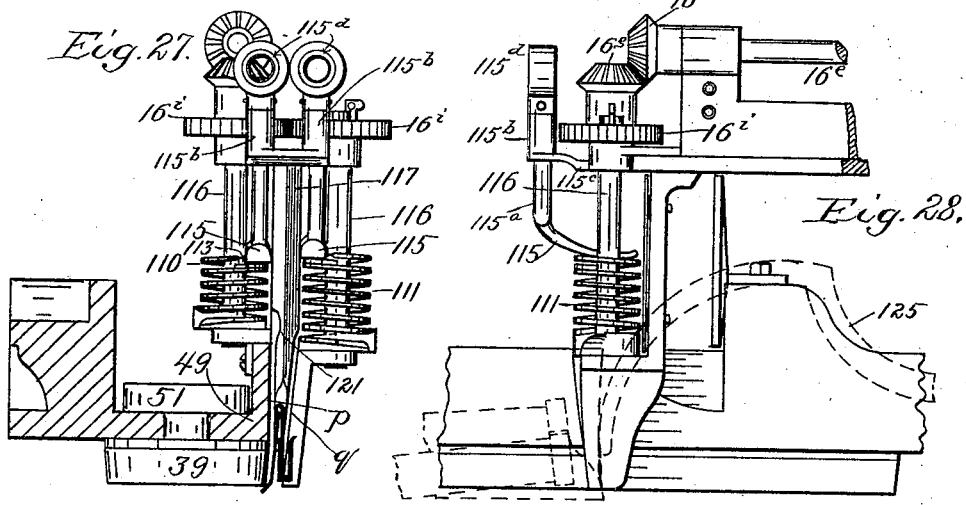
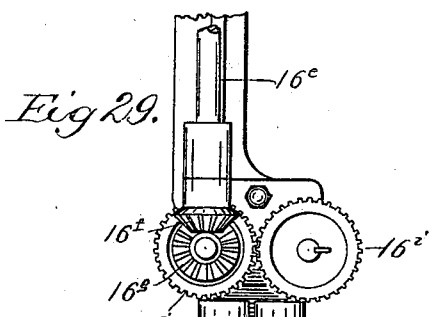
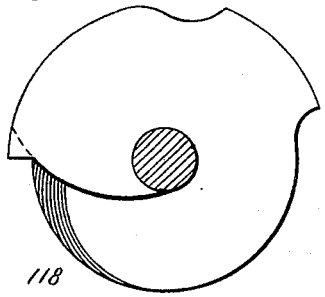
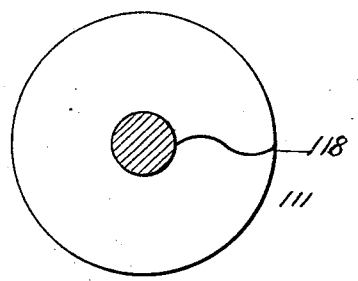
Witnesses
Inventor
Emmet Horton
by Rhesa G. DuBois
Attorney No. 635,725. Patented Oct. 24, 1899.
E. HORTON.
BASKET MAKING MACHINE.
(Application filed Aug. 8, 1898.)
(No Model.) 15 Sheets—Sheet 13.

Witnesses
E. A. Balloch,
A. M. Parkins.

Inventor
Emmet Horton
By his Attorneys
Baldwin, Davidson & Wight.

THE NORRIS PETERS CO., PHOTO-LITHO., WASHINGTON, D. C.

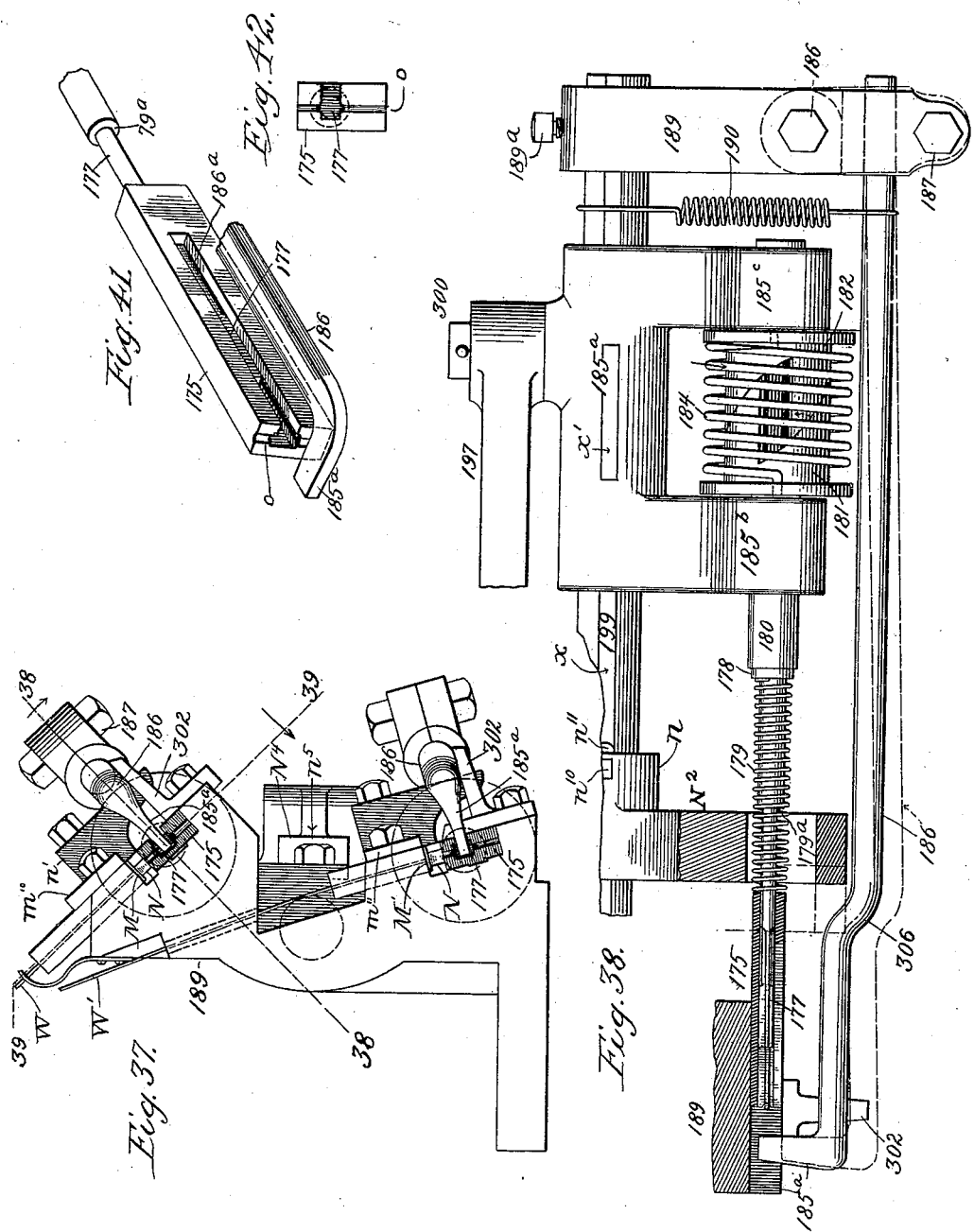

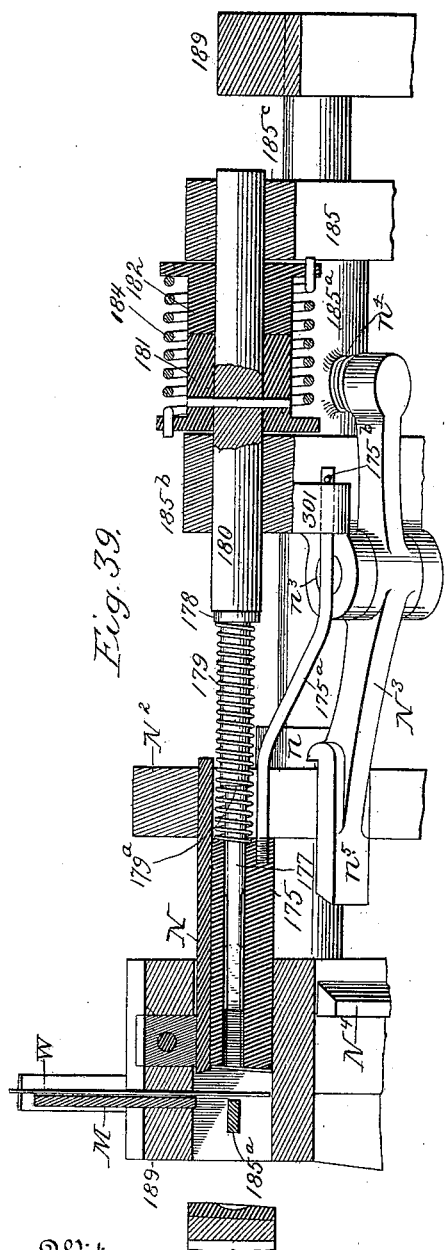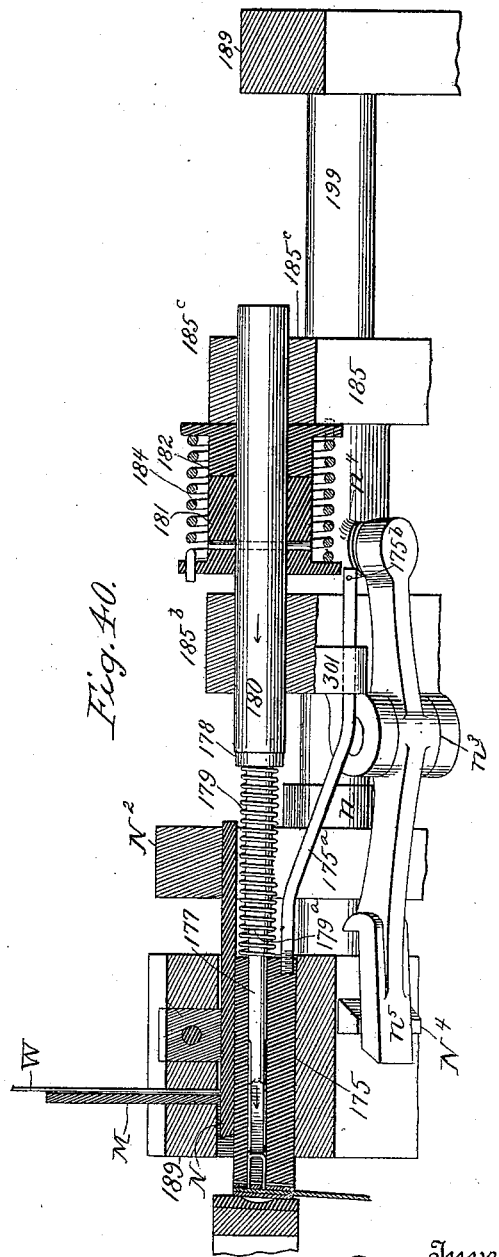

UNITED STATES PATENT OFFICE.

EMMET HORTON, OF ELMIRA, NEW YORK, ASSIGNOR TO THE HORTON BASKET MACHINE COMPANY, OF WASHINGTON, DISTRICT OF COLUMBIA.

BASKET-MAKING MACHINE.

SPECIFICATION forming part of Letters Patent No. 635,725, dated October 24, 1899.

Application filed August 8, 1898. Serial No. 688,138. (No model.)

*To all whom it may concern:*

Be it known that I, EMMET HORTON, a citizen of the United States, residing at Elmira, in the county of Chemung and State of New York, have invented certain new and useful Improvements in Basket-Making Machines, of which the following is a specification.

My invention relates to the class of basket-making machines shown in my Patent No. 530,048, of November 27, 1894. The machine of that patent is designed to automatically make baskets of veneer by assembling the blanks for the bottoms and sides and the bands for uniting the sides at the top and bottom of the basket. The parts of the basket are automatically secured together by staples automatically formed and driven as the operation of assembling the parts progresses.

The object of my present invention is to improve the construction and operation of machines of this class.

The first part of my invention relates to the mechanism for supplying bottom pieces from a supply receptacle or magazine. In this connection my invention consists in so constructing the bottom-supply receptacle or magazine that it may be made adjustable in an improved way for different sizes of bottoms, and, further, in so supporting it that it will yield and move out of the way when subjected to abnormal pressure. My invention consists also in this connection in so constructing the crane or mechanism for conveying the bottoms from the magazine to the form that it will more readily grasp the bottoms and more readily release them.

The next part of my invention relates to the mechanism for feeding the side pieces. In this connection my invention consists in providing a receptacle or magazine for the sides constructed and mounted in an improved way and from which the sides are taken by a picker of improved construction which delivers them in an improved way to grippers that carry them to the form. In this connection my invention also consists in so operating the picker that it shall move quickly and positively when in the act of picking up a side piece, but more slowly when moving with a blank from the sides receptacle or magazine to the grippers, so that there is sure to be no liability of moving more than one side piece at a time and danger of dropping the side is avoided. In this connection my invention also consists in providing devices which so guide the sides that they may be more evenly bent around the form.

The next part of my invention relates to the band-feeding mechanism, and in this connection consists in providing improved devices for holding the bands, feeding them from the piles, and guiding and delivering them into position to be attached to the basket.

The next part of my invention relates to the stapling mechanism, and in this connection consists in providing improved mechanism for feeding the wire, cutting it into proper lengths, bending it to form staples, and driving the staples into the basket.

My invention also comprehends improvements in the general construction and organization of the mechanism and in the details of construction which will be hereinafter described, whereby the efficiency of the machine is increased.

The accompanying drawings show a basket-machine embodying my present improvements.

Figure 32:
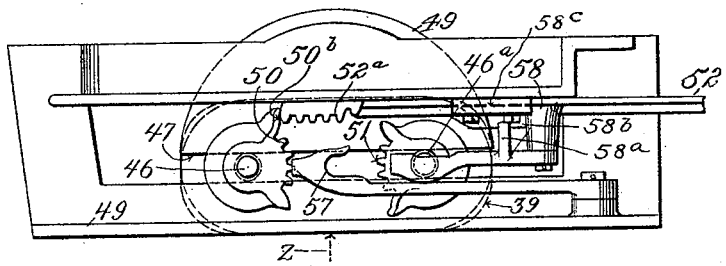
Figure 33:
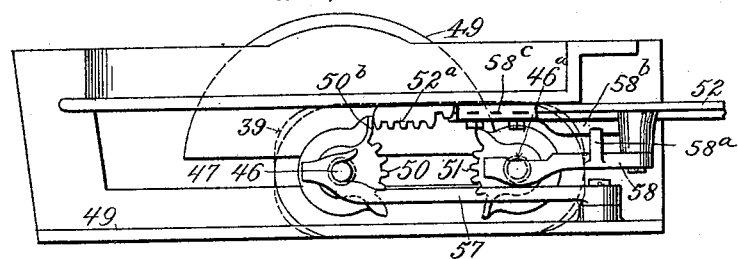
Figure 34:
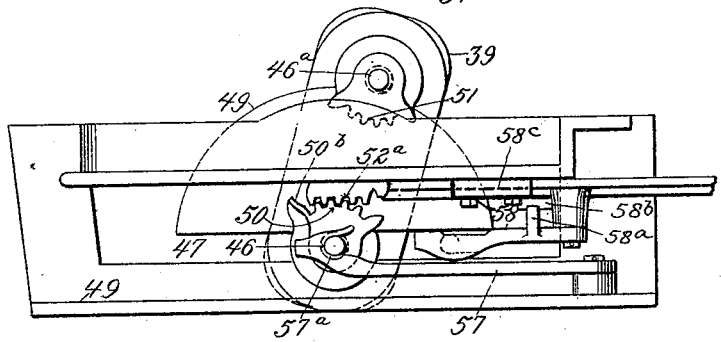
Figure 35:
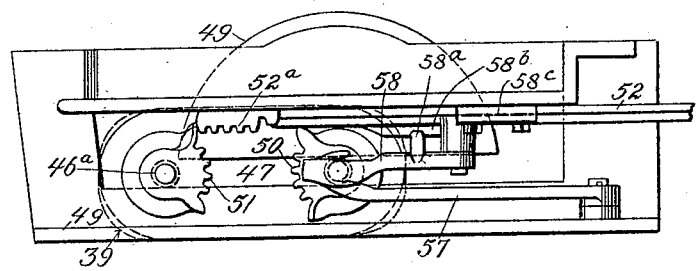
Figure 36:
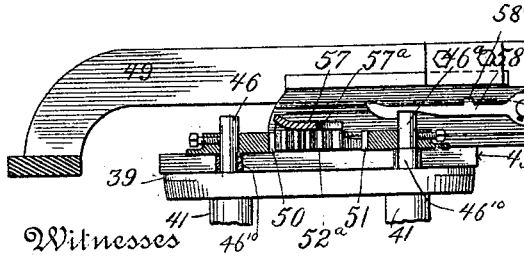

Figure 1 shows an elevation of the right-hand side of the machine, part of the main cam and gear wheel being broken away. Fig. 1ª is a detail view of the support for the outer ends of the bands. Fig. 2 shows an elevation of the left-hand side of the machine, part of the cam and gear wheel being broken away. Fig. 3 shows a top plan view with part of the cam and gear wheel removed. Fig. 3ª is a detail view showing an inverted plan of part of the mechanism for operating the crane. Fig. 4 shows a vertical transverse section on the line 4 4 of Fig. 3. Fig. 5 is a detail view of part of the devices for retaining or supporting the upper bands by the side of the form ready for nailing. Fig. 6 is a perspective detail view of part of the mechanism for supporting and feeding the lower bands. Fig. 7 is a view of the picker and the gearing for operating it. This figure also shows certain details of the sides-reservoir and the device which delivers the sides from the picker to grippers. Fig. 8 is a perspective view of the nailing mechanism. Fig. 9 shows certain details of construction of the nailing mechanism. Fig. 10 is a perspective view showing the picker, the gripper, and some of the mechanism for operating them. Fig. 11 shows a transverse section through the gripper and some of the parts connected therewith. Figs. 12 and 13 are views illustrating the manner in which the side-holder operates to deliver the sides to the gripper. Figs. 14 and 15 are views illustrating the manner in which the sides are applied to the bottom. Fig. 16 is a perspective view illustrating the manner in which the upper bands are fed down toward the form. Fig. 17 is a top view of part of the band-feeding mechanism. Fig. 18 is a perspective view illustrating the gearing for operating the feeding mechanism for the upper bands. Fig. 19 is a perspective view of the bridge-plate for supporting and guiding the form. Fig. 20 is a plan view of the form. Fig. 21 is a perspective detail view showing one of the plates in the side of the form used for clenching the staples. Figs. 22 and 23 are detail views of the clenching-plates. Fig. 24 is a perspective view of a basket made by my improved machine. Fig. 25 is a detail plan view of the crane and part of its operating mechanism. Fig. 26 is a perspective view showing a modified form of mechanism for operating the crane, the basket-ejector, and the band-feeding mechanism. Fig. 27 is a front elevation of a modification of the band-feeding mechanism, showing also its relative position with reference to the form. Fig. 28 is a side elevation of the same. Figs. 27 and 28 show a modified form of weight for holding down the upper bands. Fig. 29 is a detail view of the gearing for operating the band-feed screws. Figs. 30 and 31 are plan views of the feed-disks which coöperate with the feed-screws for delivering the upper bands to the chute which conveys them to the form. Fig. 32 is a detail plan view illustrating particularly the manner of operating the form. Figs. 33, 34, and 35 are similar views showing the form in several successive different positions. Fig. 36 shows a vertical section of the same. Fig. 37 is an elevation of the inner end of the nailing mechanism. Fig. 38 shows a section therethrough on the line 38 38 of Fig. 37. Fig. 39 is a view in longitudinal section of a portion of the nailing mechanism on the line 39 39 of Fig. 37. Fig. 40 is a similar view with the parts in different positions. Fig. 41 is a detail view of the staple-forming head, the driver, and the bender. Fig. 42 is a detail end view of the nailing-head.

The main frame $1^a$ may be of any suitable construction to properly support the mechanism. A main cam and gear wheel 1 is secured to a shaft A, mounted in bearings in the frame, and is driven in the direction indicated by the arrow. A belt-pulley 2 is mounted loosely on a shaft $a$, which carries a pinion $a'$, meshing with a spur-wheel 3 on a shaft $3'$, which in turn carries a pinion $a^2$, meshing with a peripheral series of teeth $a^3$ on the wheel 1, one revolution of which produces a single completed basket. The pulley 2 is connected to revolve with the shaft $a$ by a clutch 4, which is actuated by either a hand-lever 5 or a foot-lever 6. The hand-lever is connected by means of a link $5'$ with an arm $5^2$, projecting laterally from the upper end of a shaft 7, the lower end of which is connected with the clutch. The foot-lever is pivoted at $6^a$ to the frame, and it is connected to the shaft 7 near its lower end by a slotted link 9, engaging an arm 8, projecting from the shaft 7. By this means the machine may be started and stopped at the will of the operator.

The bottoms 10 for the basket are of the usual oblong form, and they are stored in a magazine 11, located on the left-hand side of the machine about midway between its opposite ends and above the horizontal plane of the form 39. This magazine has two vertical trough-shaped end pieces 101, conforming to the shape of the ends of the bottoms. They are provided at their lower ends with laterally-projecting lugs 103, having square openings which fit a square rod 102, pivoted by a bolt $102^a$ to a bracket $105^b$, projecting from the main frame. An arm 105 is secured to the rod 102, and its outer or rear end is provided with an open curved slot $105^d$, through which extends a bolt $105^e$, that is secured to the bracket $105^b$. By means of the bolt $105^e$ the arm 105, and consequently the magazine 11, may be adjusted to any desired position. The arrangement also serves another purpose. While the bolt $105^e$ holds the magazine steady for ordinary purposes, it will permit the arm 105 to swing inwardly in case the magazine is subjected to extraordinary pressure. For instance, if the crane which carries the bottoms from the magazine to the form should fail to operate properly and its jaws should be closed when it comes back to the magazine then the pressure on the magazine would be abnormal and the arm 102 would be swung back to a proper extent, so as to avoid any breakage. Afterward the attendant may adjust the magazine to its normal position, when the parts are again in proper working order. The end pieces 101 may be adjusted on the rod 102 by means of set-screws $103^a$. The bottoms are supported from beneath by fingers 104, arranged between the side pieces 101, there being a clear space between the fingers and the lower ends of the side pieces, as shown in Fig. 2. The fingers are provided with eyes $104^a$, made adjustable on the rod 102 by set-screws. The crane $10^a$, which conveys the bottoms from the magazine to the form 39, has an arm $10^b$, which is secured to the lower end of a short vertical shaft $10^c$, the upper end of which is secured to an arm 21, connected at its opposite end to a pitman-rod 22, that is connected to a cross-head 17, secured to a bar 19. The cross-head 17 is provided with a downwardly-projecting portion $17^a$, on which is mounted a collar $17^b$, (see Fig. $3^a$,) provided with laterally-projecting lugs, between which the end of the rod 22 is jointed by means of a pin 23, which may be readily removed when desired in order to disconnect the rod 22 from the cross-head 17, so that the machine may be operated without operating the crane or the crane operated independently of the other parts of the mechanism, this being desirable sometimes when adjusting the machine. The collar $17^b$ is provided with a lug X, and the cross-head 17 has a lug Y projecting downwardly. Normally the lugs X and Y are in contact, and as the cross-head reciprocates the crane is operated uniformly; but should the crane meet with any obstruction sufficient to overcome the gripping tension given the collar $17^b$—as, for instance, if the basket by any accident should not be ejected from the form and the crane carrying a bottom should strike against the basket—there would be an abnormal pressure and the collar would turn on the part $17^a$, thus relieving the strain. After the obstruction is removed the collar may be turned back and again gripped on the projection $17^a$, with the lugs X and Y together again, thus bringing the parts in their normal position. The gripping resistance of the collar may be adjusted to any desired extent. The rod 19 is mounted to reciprocate fore and aft in bearings 20. The cross-head 17 is connected by means of a rod 18 with a disk 16, secured to a shaft 14, mounted in bearings just inside the upper part of the wheel 1, directly over its axis. A pinion 13 on the shaft 14 gears with a segment of teeth 12 on the inside of the wheel 1. This mechanism causes the cross-head 17 and the rod 19 to be reciprocated in the proper manner. The pinion 13 is prevented from rotating, except when engaged by the teeth 12, by sliding on the blank surface 15 on the inside of the rim of the wheel 1. When the pinion engages with the teeth 12, it makes one complete revolution and effects the reciprocation of the cross-head 17 and rod 19, as before described. The arm $10^b$ of the crane carries a frame $10^d$, to which are pivoted two bell-crank levers 24, the upper ends of which are formed with jaws to fit the ends of the basket-bottoms and the lower ends are formed with intermeshing segments of teeth 25. The jaws are normally drawn toward each other by a coil-spring 29 and are opened against the force of this spring. One of the downwardly-extending arms is prolonged in order to come in contact with an adjustable bolt 26, carried by a lug 27, projecting from a sleeve 28, carried by the stem 37 of the table 32. The bolt 26 limits the movement of the jaws and also operates to open the jaws when they are closed and when the table 32 lifts the bottom up into place under the form. The jaws are also opened at the proper time by a hook 30. (Shown most clearly in Fig. 25.) This hook is pivoted at $30^a$ to the main frame $1^a$, near the pivot $10^×$ of the arm $10^b$. It is connected to the arm $10^b$ by a spiral spring $10^c$. At its outer end it is provided with a tooth or shoulder $10^f$, adapted to engage with one of the jaws, and it is also provided with a lug $10^g$, which is adapted at times to strike against a stop 31, rigidly secured to the frame $1^a$. As the crane passes out from beneath the form toward the magazine 11 the hook 30 follows with the crane, its free end bearing against the side of one of the jaws 24, as shown in dotted lines in Fig. 25, and by the time the crane comes under the bottoms in the magazine 11 the hook strikes against the stop 31. The continued movement of the crane draws the jaws away from the hook and the spring 29 closes the jaws against the lowermost bottom in the pile and centers it on the table 32.

It will be understood that after the jaws grasp a bottom the crane is swung inwardly toward the form, and when directly under the form it delivers the bottom thereto. The delivery of the bottom is effected by the table 32. As before described, the spindle 37 of this table carries a sleeve 28, and this sleeve is provided with a laterally-projecting lug 36, which is engaged by the front end of a lever 33, which is shown in side elevation in Fig. 2. This lever is pivoted to the frame $1^a$ at $33^a$. The rear end of the lever is provided with a roller 34, which bears on a cam 35 on the cam and gear wheel 1. The cam is so shaped as to operate the lever at the proper time when the crane is beneath the form to lift the table, slightly spread the jaws 24 apart to release the bottom, then further lift the table, and cause the bottom carried by the crane to be forced into engagement with the pins 38 on the feet $32^b$ of the form. The construction of the form will next be described.

An oblong frame-piece $39^a$, corresponding in shape to the top of the basket, surrounds two downwardly-projecting legs 41, which have their axes coincident with the axes of the semicircular ends of the form. These legs are joined to the frame $39^a$ by radial bars 42. From the lower ends of the legs project arms 43, which are provided with downwardly-projecting pins 38, adapted to enter the basket-bottom 10, as shown in Fig. 4. These pins are threaded and passed through correspondingly-threaded holes in the arms 43. They are also threaded at their upper ends and provided with lock-nuts 45. The pins may be adjusted vertically and locked in position by means of the lock-nuts 45. From the legs 41 project upwardly short stud-axles 46 and $46^a$. These axles are secured rigidly to the legs, and the form revolves about the axes of these axles in the manner hereinafter described. Each axle has secured to its upper end a toothed segmental plate 50 or 51. The form is supported by plates 48 and 49, which have between them a slot or passageway 47. These plates are horizontal, the plate 48 having a semicircular outer periphery, while the plate 49 is merely an angular plate. These plates are joined together, as indicated in Fig. 19. The plate 49 is slotted at 47, as shown in Fig. 19, and is formed with the part 49ª, which bridges over the plate 48, which is secured thereto, but held a suitable distance therefrom, by a T-shaped block 48ª. There is a clear space between the top of the plate 48 and the under side of the bridge 49ª, and the slot 47 is open at 47ª. The segments 50 and 51 rest on the top of the plates 48 and 49, the axles 46 and 46ª projecting through the slot 47, the remainder of the form being below the plates 48 and 49. The axles 46 and 46ª are provided with rollers 46¹⁰, which are of the same width as the slot 47, and they are also of the same thickness as the plates 48 and 49.

The manner in which the form is operated is indicated in Fig. 3 and is also more minutely illustrated in Figs. 32 to 36, inclusive. A rack-bar 52 is provided with a series of teeth 52ª, and this bar is connected by means of a link 56 with a bell-crank lever 54, pivoted at 54ª to the main frame and carrying a roller 55, which engages a cam-groove 53 in the wheel 1. The rack 52ª engages the segments 50 and 51 successively to rotate the form. The rack-bar carries a pawl 58, which is pivoted to a stud projecting laterally from the bar, as indicated in Fig. 3 and also in Figs. 32 to 36. This pawl is adapted to engage the ends of the axles 46 and 46ª, which project upwardly above the segments 50 and 51. A pawl 57 is pivoted to a stud projecting from the main frame, as shown in Figs. 3 and 32 to 36, and is also adapted to engage the upwardly-projecting ends of the axles 46 and 46ª.

In Fig. 32 the form is shown in position to receive the first side piece, the nailing-line being indicated at $z$. The rack-bar next moves backwardly, and as the pawl 58 engages the axle 46ª the form will be drawn rearwardly to the position shown in Fig. 33. At this time the axle 46ª is outside the circular edge of the plate 48 and the pawl 57 has dropped over the end of the axle 46. The pawl 57 is recessed at 57ª to engage the axles, and this recess is curved, so that the axle may rotate within it. The rack-bar 52 is properly guided, so as to reciprocate horizontally, by a guide-casting 58ᶜ, secured to the bridge-plate, and the pawl 58 is prevented from dropping too far downward by means of a stud 58ª, which projects across a flange 58ᵇ, extending laterally from the rack-bar. By reference to Fig. 34 the utility of this device will be understood. If it were not for the stud 58ª and the flange 58ᵇ, the pawl 58 would drop and become inoperative.

The parts being in the position shown in Fig. 33, the rack-bar 52 will have reached the limit of its backward stroke. When it begins to move forwardly, its front end strikes against one of the ears 50ᵇ of the segment 50. As the shaft 46 is held against a longitudinal movement in the slot 47 the segment 50 will be rotated, thus causing the form to move in the arc of a circle around the plate 48, as indicated in Fig. 34, the pawl 58 then becoming idle. Fig. 35 indicates the position of the parts when the rack-bar has reached the limit of its outward stroke, and by this time the form has been completely reversed and the pawl 58 drops into engagement with the axle 46. When the rack-bar moves backwardly again, it draws the form rearwardly between the plates 48 and 49 until they reach the position indicated in Fig. 32, when the form is again reversed. While the form is being turned in this manner the sides and bands are fed, and they are nailed in the manner hereinafter described. It will be observed that the cam-groove 53 is of an irregular or wavy shape, the object being to give an intermittent movement to the form, so that it shall stop each time that a nail or staple is driven and then proceed.

In order to more effectually bend the ends of the staples and to take the wear, I provide a series of clenching-plates 206. These are preferably dovetailed into the sides of the frame 39ª, as shown in Figs. 20 and 21. The plates are provided with curved grooves or recesses 207. In Fig. 21 a single row of grooves arranged side by side is shown, while in Fig. 23 two series of grooves, one above the other, are illustrated. The grooves are arranged vertically and are concaved for the purpose of clenching or bending the ends of the staples. Fig. 22 illustrates how the staples strike the grooves, and it will be seen that the construction is such as to effect the inward bending of the staples to clench them. Only one groove at a time is used to bend a staple in the construction illustrated in Figs. 21 and 22; but as the relation of the form to the stapling mechanism may vary I prefer to employ a series of grooves, so that if the staple misses one groove it will strike another. In Fig. 23 the arrangement of the grooves is somewhat different. One row of grooves is arranged above the other, and the effect would be to bend the ends of the staples outward. Not only do the clenching-plates bend the staples, but they prevent undue wear on the frame 39ª. The clenching-plates may be removed and replaced whenever desired.

The side pieces are stacked in a hopper 60ª. This consists of angle-plates 60ᵍ, provided with flanges 60ʰ, through which extend bolts 60ⁱ, securing them to the bottom plate 60ᑫ. This bottom plate is attached to the top 60ᵐ of a bracket 60ᵈ, which is attached, by means of a bolt 60ᵉ, to a bracket 60ᵉ, projecting from the main frame 1ª. A bolt 60ᵇ, extending through a slot in the frame 1ª, permits of the bracket being adjusted vertically and securely clamped in any desired position. The bracket 60ᵉ is provided with laterally-projecting lugs, through which extend adjusting-bolts 60ᶠ, which bear against the bottom plate 60ᵐ of the bracket 60ᵈ and by means of which the bottom plate 60ᑫ may be given the desired inclination.

As illustrated in Fig. 3, the bolts 60ⁱ extend through slots 60ᵏ in the flanges 60ʰ, by which means the corner-posts $60^g$ may be adjusted. The picker passes down into the magazine $60^a$, lifts one plate at a time therefrom, and delivers it to a holder 61, from which a gripper takes it, as will be hereinafter described. The picker-arm 75 is revolubly mounted in two sleeves $75^a$ and $75^b$, connected by a curved arm $75^c$, all of these parts $75^a$, $75^b$, and $75^c$ being preferably made in one integral casting and will be called the "picker-frame." It is hinged on a rock-shaft 77. The picker 75 is provided at its upper end with needles $75^e$, which are adjustably held in a pair of pincers $75^f$, mounted on a cross-head $75^g$. (See Fig. 3.) Tightening-screws $76^h$ may be employed for opening and closing the pincers and causing them to firmly grasp the needles. Set-screws $75^x$ may be employed for locking the screws $76^h$ to prevent them from shaking loose. The sleeve $75^b$ is provided with a laterally-projecting arm $75^y$, over which extends the end of a spring $75^p$, as indicated in Fig. 2. This spring is coiled around the shaft 77, and one end is secured to a collar $76^a$, attached to the rock-shaft. An arm $75^r$ is secured to the rock-shaft on one side of the arm $75^y$. When the rock-shaft moves in one direction—viz., in the direction to move the picker toward the sides-magazine—the picker-frame is moved through the medium of the spring $75^p$, which tends to press the arm $75^y$ against the arm $75^r$. For a time the arms $75^y$ and $75^r$ move together; but after a time the picker enters the sides-magazine, and then the shaft 77 and arm $75^r$ continue to turn without moving the picker-frame, the spring $75^p$ being put under compression. When the shaft 77 moves backward, the arm $75^r$ comes against the arm $75^y$, and thereafter the shaft and picker-frame move together. By this arrangement the upstroke of the picker is always positive, and it moves always to the same point, while the downstroke is variable, according to the number of sides in the magazine.

The manner of operating the picker will be more fully described presently.

The holder 61 is shown in Figs. 12 and 13, as well as in Figs. 1, 2, 3, and 7. The lower portion of the holder is L-shaped, as shown in cross-section in Fig. 7, and the side piece $e'$ rests on the lateral projection of this L-shaped piece. This portion of the holder is attached to another portion $61^e$, which is pivoted at $61^a$ to a bracket $1^e$ of the frame $1^a$, and this portion of the holder is provided with a segment of teeth $73^a$, meshing with a corresponding segment on an arm $73^e$, pivoted at $73^f$ to the bracket $1^e$. The arm $73^e$ is rigidly attached to an arm 72, which is connected, by means of a rod 73, to a lever 69, pivoted at 70 to the frame $1^a$ and carrying at its lower end a lug 71, which is adapted to be engaged by the cams 65, 66, 67, and 68 on the cam-wheel 59. The side pieces $e'$ are held in the holder by a spring-actuated clamp 62. (Shown most clearly in Fig. 7.) Secured to the rock-shaft 77 is a disk 76, provided with a tooth 78, with which a tooth on the pawl 79 is adapted at times to engage. This pawl is connected at its upper end with an arm $79^a$, projecting from a shaft $79^b$, to which the clamping-arm 62 is also secured. The shaft $79^b$ has a spring $79^c$ attached to it, (see Fig. 3,) which is also secured to the main frame. The spring $79^c$ tends to press the arm toward the holder 61. The shaft 77 revolves in the direction indicated by the arrow in Fig. 7, and at the proper time the tooth 78 engages with the tooth on the pawl 79 and moves the clamp 62 from the position shown by full lines in Fig. 7 to that shown by dotted lines in the same figure. When in the position shown by dotted lines in Fig. 7, the side $e'$ may be delivered to the holder; but after the side has been delivered and before the picker recedes the clamp 62 returns and holds the side piece in the holder. A bolt $78^a$ is secured to the disk 76, and this bolt is adapted to strike against the pawl 79 and free it from the tooth 78 at the proper time. After that the curved edge of the disk rides along the pawl, which is then free, and permits the clamp 62 to press on the side piece, as above described.

It will be observed by reference to Fig. 7 that the picker takes up a side piece on one side of the machine and delivers it to the holder 61 on the opposite side thereof. It is therefore necessary to give the picker-arm 75 a half-turn. For this purpose a segment of teeth $75^h$ is secured to the picker-arm 75, and this engages with a segment of teeth $75^i$, formed on a curved plate $75^k$, the arrangement being such that as the picker-frame moves around the axis of the shaft 77 the teeth on the segments $75^h$ and $75^i$ will engage and cause the picker-arm 75 to be given a half-turn. In order to prevent the picker-arm from moving when the segments are not in engagement, I provide a smooth double-faced collar $75^l$, rigid with the pinion $75^h$ on the picker-arm, which rides along a smooth face $75^m$ on the curved plate $75^k$. The plate is cut away at $75^n$, so that the picker-arm may revolve at the proper time. The collar $75^l$ has a straight flat face on opposite sides to prevent rotation.

In order to effect the rapid operation of the picker, I arrange to give it a differential movement. When the picker is moving downwardly toward the pile of sides, it may move quickly; but when receding with a side it should move more slowly. If the picker moves very rapidly just after having engaged a side piece, the tendency is to lift a number of side pieces, as the side pieces below the top one tend to adhere to the top side piece, which is grasped by the picker. If, however, the picker moves slowly at this time, this tendency to adhere is obviated. It is also undesirable to have the picker move very rapidly after having left the sides-magazine and while carrying a side to the holder 61, because if it moves very rapidly the pressure of air in front of the side piece tends to detach it from the picker.

I therefore organize the apparatus to cause the picker to move toward and into the sides-magazine rapidly, but to recede therefrom more slowly, and especially to move it most slowly at the beginning of the receding motion. The shaft 77 has secured to it an arm 91, on the lower end of which is clamped a coupling 93, to which is jointed a rod 92, that is in turn jointed to a wrist-pin $90^a$ on a disk 90, secured to a shaft 89. (See Fig. 10.) On this shaft is secured an elliptical spur-wheel 87, which meshes with a correspondingly-shaped wheel 86 on a shaft 88, which carries a bevel-pinion $88^a$, gearing with a pinion $88^b$ on a shaft 85, to which is secured a pinion 84, driven by teeth $84^b$ on the main cam and gear-wheel 1. The gearing is such that the picker oscillates between the sides-magazine $60^a$ and the holder 61 at a differential speed, moving comparatively rapidly when moving toward the magazine, but more slowly when moving away therefrom toward the holder 61.

It will be observed that a differential movement is imparted to the picker-arm not only by the elliptical gears, but by the relative position and movement of the crank-pin $90^a$ and the connection of this crank-pin with the picker-arm through the medium of the connecting-rod 92, the shaft 77, and the arm 91. The elliptical gearing is so related to the position of the crank-pin, as will next be described, as to give to the picker-arm the desired movement. When the picker-arm is on the point of rising from the side of the magazine, the crank-pin $90^a$ is on one of its dead-centers and the gears 86 and 87 are engaged with each other, so that the gear 86 will impart a medium speed to the gear 87—that is to say, teeth on medium radii of the two gears are thus engaged. As the crank-pin moves upwardly in the direction indicated by the arrow in Fig. 7 it starts the connecting-rod 92 with a hardly-perceptible motion, which would naturally (discarding the elliptical gearing) gradually increase in velocity until it (the crank-pin) has moved through an arc of ninety degrees. It will then gradually decrease in velocity for ninety degrees until it reaches its opposite dead-center. In like manner when the crank-pin moves ninety degrees farther said motion will gradually increase in velocity, which will impart a gradually-increased velocity to the picker, and then when moving through the next ninety degrees it imparts a gradually-decreasing velocity to the picker. This movement imparted from the crank-pin to the picker-arm is modified by the elliptical gears in the manner next to be described.

As before stated, when the crank-pin is on its lower dead-center the gears 86 and 87 have teeth on medium radii engaged. As the gear 86 is revolved in the direction indicated by the arrow in Fig. 7 the radii of the teeth on the gear 86 which come into gear with the gear 87 gradually decrease, while the radii of the teeth on the gear 87 gradually increase. This gearing tends to slow down the speed imparted to the disk 90, and consequently to the picker. This relation is maintained while the crank-pin is moving through an arc of ninety degrees. The effect is to impart a substantially uniform and slow upward movement to the picker after its starting. After the crank-pin has moved through the first ninety degrees its tendency is to move gradually more slowly; but teeth on longer radii of the driving-gear 86 come into mesh with teeth on shorter radii of the gear 87, and thus drive more rapidly the gear 87 than would the crank-pin alone. After the crank-pin has traversed the second ninety degrees the picker is at the limit of its upstroke. When the crank-pin moves through another ninety degrees, its speed is gradually increased and the elliptical gears are so related as to accelerate this increased speed of the crank-pin, as at this time teeth on the longest radii of the gear 86 mesh with teeth on the shortest radii of the gear 87, thereby causing the shaft 89 to be driven at the highest speed, which, as before stated, coöperates with the naturally high speed of the crank-pin while descending. When the crank-pin moves through the last ninety degrees, it gradually decreases in speed. At this time teeth on medium radii of the elliptical gears are engaged and tend to impart a uniform velocity to the shaft 89. The result of the gearing therefore is to first slowly raise the picker, carrying a side piece from the sides-magazine, then move it more rapidly upward to the holder 61, and after having delivered it to the holder the picker is moved downward at a very high speed until it has nearly reached the pile of sides, when its movement is slowed up to some extent, but is yet sufficient to cause the picker to enter the magazine with sufficient force to engage the side piece.

By reference to Fig. 1 it will be seen that the circle of teeth $84^b$, which drives the pinion 84, is not continuous. There is a blank space $84^a$ between the ends of the arc of teeth $84^b$, the arrangement being such that during one complete revolution of the wheel 1 (for making a completed basket) the picker is stopped long enough to allow the basket to be ejected. In the machine illustrated the picker raises six sides during each revolution of the wheel 1 and then stops while the basket is being ejected, the stopping-point being the position of the picker shown in Fig. 7. By adjusting the position of the crank-pin or the positions of the elliptical gears the speed and stopping-point may, if desired, be adjusted.

The gripper, which is shown most clearly in Figs. 10 and 11, consists of a fixed jaw $105^o$ and a movable jaw $105^p$. The fixed jaw $105^o$ is preferably formed integrally with a casting 160, which is adapted to slide back and forth on a guide-rail 161, which is slightly inclined, as shown in Fig. 1. The movable jaw $105^p$ is pivoted at $105^r$ to the jaw $105^o$, and it is connected at $105^s$ with the upper end of a lever 157. This lever is connected at 157ᵃ with a short link 158, which is pivoted at 158ᵃ to the casting 160. The lower end of the lever 157 is connected at 156 with a rod 98, jointed at 100 to a clamp 157, which is secured to the upper end of a rod 97, pivoted at 97ᵃ to a bracket 95, that may be adjusted on the main frame longitudinally by a slot-and-bolt connection 99. The rod 97 is connected near its upper end with a rod 96, which in turn is jointed to the upper end of a crank-lever 94, weighted at its lower end 95ᵃ. It will be observed that the grippers are actuated from the same shaft 84 that actuates the picker. The inclination of the guide-bars 161 can be adjusted by means of opposing set-screws 162. (Illustrated in Fig. 1.) In Fig. 10 the parts are supposed to be moving in a direction indicated by the arrow and the grippers are receding from the basket-form. At this time the jaws of the gripper are open, and while open they receive a side piece. Before the grippers commence to move forward the jaws are closed through the connection before described. In like manner before the gripper starts backward toward the holder 61 the jaws open and the side is left delivered to the form.

In Figs. 12 and 13 I have illustrated how the holder 61 holds the side pieces in correct position to be delivered to the form. The normal position of the holder is as indicated in Fig. 13, and in this position it receives all side pieces from the picker. When moved out of this position, it is actuated by the cams 65, 66, 67, and 68, which act on the hanging lever 69, which latter is connected to the holder in the manner before described.

As indicated in Fig. 13, a side piece for one end of the basket is ready to be delivered, and it will be observed that the lever 69 is not in contact with one of the cams. As soon as this side piece for the end of the basket has been delivered the cam 65 comes in contact with the lever 69 and through the connections before described turns the holder 61 into the position shown in Fig. 12. When in this position, the grippers take the side piece and deliver it to the side of the form next to the end piece previously delivered. In like manner the cams 66, 67, and 68 operate to tilt downwardly the holder 61. When the cam-wheel 59 is in such position that the lower end of the lever 69 is between the cams 65 and 68, as illustrated in Fig. 13, or between the cams 66 and 67, the holder is inclined upwardly, as indicated in Fig. 13, and in position to deliver a piece of veneer for the ends of the basket; but when the lever 69 is acted on by the cams 65, 66, 67, and 68 veneer for the straight sides of the basket is delivered.

The holder, as before described, swings on the pivot 61ᵃ. Its downward movement may be limited by a set-screw 74ᵃ, carried by a lug 74, projecting from the holder and through which the bolt extends. The lower end of the bolt may bear against the top of the bracket 1ᵉ. By this arrangement the holder may be adjusted to give the proper pitch to the end pieces. As indicated in Fig. 12, the side pieces for the long sides of the basket are delivered to the grippers with their upper and lower edges horizontal. These sides of the completed basket are but slightly curved; but the end pieces are curved considerably, and if they were delivered to the form in the manner indicated in Fig. 12 they would not wrap properly around the ends of the form, and therefore when delivering an end piece the holder 61 is inclined, as indicated in Fig. 13, so that the gripper will carry the piece in this inclined condition and deliver it to the form in such manner that when it is wrapped around the end of the form its upper and lower edges will coincide with the corresponding edges of the side pieces.

Figs. 14 and 15 show how the side pieces are arranged on the bottom piece 10.

The operation of feeding the sides will be hereinafter explained again in connection with the description of the operation of the entire machine in assembling the component parts of the basket and securing them together.

Before proceeding to a description of the band-feeding mechanism I will call attention to a certain feature of construction shown in Figs. 4 and 20. 81 indicates a finger having a serrated inner face and secured to a shaft 82. This shaft projects through one side of the form-plate 39ᵃ, as indicated in Fig. 4, and the finger 81 is arranged on the end of the shaft outside the form-plate. The shaft 82 is inclined, as indicated in Fig. 4. One end has a bearing in a recess in the frame 39ᵃ. A spring 83, attached to the shaft and to the frame, normally holds the serrated finger 81 in the position shown in Fig. 20, and when in this position it is adapted to receive, grasp, and hold the first side piece which is delivered to the form. An arm 81ᵃ is rigidly secured to the shaft 82, and at the proper time this arm is engaged by an ejector, which will be hereinafter described, which turns the shaft 82 in such manner as to withdraw the finger 81 from the side piece and permit the basket to be ejected.

The bands 112 for binding the top of the basket have their outer ends supported on a support P, as indicated in Figs. 1 and 1ᵃ. This support consists of an upright or standard 138, having a rearwardly-projecting arm 137, on which is a sliding block 136, which supports hangers 135, provided with means for holding the outer ends of the bands, which are arranged in a pile 134ᵃ, as indicated in Figs. 1 and 1ᵃ. Each of these hangers carries a cross-piece 135ᵃ, on which the bands rest. This cross-piece is arranged above the lower ends of the hangers, so that the bands may turn when being separated from the piles. The rear ends or inner ends of the bands rest on screws 110 and 111, which are secured to vertical shafts 116, which have bearings at their upper ends in the bracket 1$^b$ of the frame and at their lower ends in suitable brackets on the main frame. The front ends of the bands are pressed down on the tops of the screws by weights 115, which are free to slide vertically on the shafts 116. The upper end of each screw is curved to form a projecting rounded point 113, which is adapted to wedge its way above the lowermost band of the pack and separate it from the others. The weights 115 are provided with handles, by means of which they may be raised by the attendant to insert new piles of bands when desired. A guide-bar 117 projects downward from the bracket 1$^b$ between the piles of bands and in connection with the shafts 116 holds the piles in a true vertical direction. To the lower end of each shaft, below each screw, is secured a disk 118, the form of which is shown in Figs. 16 and 17. It will be observed that each disk is formed with an incline 119 and a groove 120, which form a continuation of the corresponding screw 110 or 111. The disks revolve in the direction indicated by the arrows in Figs. 16 and 17. The bar 117 is provided with a prolongation or guide 121, which is so formed as to receive the edges of the bands and turn the bands inwardly and downwardly, as indicated in Fig. 16, when the bands are forced against the guide 121 by the disks 118. The guide 121 merges into straight vertical sides 121$^a$, so that the inner ends of the bands are finally turned so that their edges lie vertically one above the other, in which position they are ready to be applied to the form, which is arranged on a vertical axis.

In Figs. 27 and 28 the screws 110 and 111 are shown as somewhat longer—i. e., having a greater number of convolutions—and the weights 115, instead of sliding on the shafts 116, are provided with vertical stems 115$^a$, which extend through guides 115$^b$ on a bracket 115$^c$. At their upper ends the weights are provided with suitably-formed handles 115$^d$. The extension 121 of the guide-bar 117 terminates just above the horizontal plane of the form. It extends downwardly between the side walls $p$ and $q$, which together form a chute divided by the guide 121. The bands are delivered down each side of the chute and are held a suitable distance apart by the guide 121. The shafts 116 are geared together by spur-wheels 16$^i$. One of the shafts carries a bevel-pinion 16$^g$, meshing with a corresponding pinion 16$^f$ on a shaft 16$^e$, the rear end of which carries a bevel-pinion 16$^d$, meshing with a corresponding pinion on a shaft 16$^c$, carrying a pinion 16$^b$, which meshes with a segment of teeth 16$^a$ on the plate 16, which in turn is carried by the short shaft 14, heretofore referred to, which carries a pinion 13, meshing at times with the teeth 12 on the cam and gear wheel 1. The arrangement is such as to turn the shafts 116 at the proper time to feed the bands 112 laterally and into the mouth of the chute and hold them down. For the purpose of delivering the bands through the chute I employ a plunger 125, provided with a large lower end or head adapted to operate on both bands. This plunger is pivoted at 125$^c$ to the main frame and at its rear end is formed with an irregular slot 125$^b$, in which travels a roller 125$^a$, carried by the downwardly-extending portion of the cross-head 17. The plunger has a lug 125$^b$, guided in a way 125$^d$. This prevents lateral movement of the plunger. By this arrangement the bands after having been given a quarter-turn are moved downward through the chute to the form. The band for the inside of the basket is received by a stationary plate 126, having an inwardly-turned lower end 127. The band for the outside of the basket is received by a hook 133, attached to a lever 132. The hook has an upward extension 133$^a$, which fits over the top of the plate 126, and its downward movement is limited thereby. The lever 132 is pivoted at 132$^a$ and at its rear end carries a weight 154. 133$^a$ indicates a gage-plate, against which the inner or rear ends of the bands abut. The hook 133 on the lever 132 descends with the band and holds the outer band while it is being applied to the basket; but when the band is withdrawn the lever is moved back by the weight 154. By this arrangement the hook 133 is elevated to receive a band when it is first fed into the chute, and when the plunger 125 descends and acts on the bands the hook 133, and of course the lever 132, will descend with the plunger and in advance of it. The hook 132 holds and guides the outer band while it is being applied to the basket; but as soon as the band is withdrawn from the hook the hook moves upward into position to receive a new band. If the hook 133 were stationary, the plunger might not guide the outer band properly and hold it at the proper distance from the form.

The inner ends of the lower bands are supported on the shelf 142, on which slides a follower 144, slotted at 146 and provided with a guide-screw 147. A lever 148 is pivoted at 148$^a$ to the main frame, and it is slotted at 149. Through this slot projects a pin 150, carried by the outer end of the follower 144. This pin also projects downwardly and is secured to a spring 145, attached to the plate 142. The spring normally presses the follower inwardly, but by means of the lever 148 the follower may be drawn back for the insertion of a bunch of bands. Opposite the end of the follower is arranged a vertical plate 140$^a$, having a vertical groove 140, in which reciprocates a push-bar 139, attached at 139$^a$ to the lever 33. As seen in Fig. 4, this push-bar is adapted to press against the bottom of a band $z$ and move it upwardly from the bunch 141. The outer ends of the bands rest on a support 143. (Shown in Figs. 1 and 3.) A hook 151 receives and limits the upward movement of the band as it is being pushed up out of the bunch on the shelf. The stem of the hook is encircled by a cushioning-spring 153 at its lower end.

When a band is raised by the push-bar 139, the hook 151 will rise against the force of the spring 153, but after a band is delivered the spring will cause the hook to return to its normal position. This mechanism delivers the lower band into proper position in front of the stapling mechanism, and after the first staple is driven the band is drawn out laterally and wrapped around the basket as the form revolves.

The operation of the rest of the machine is not dependent upon the particular kind of securing devices employed, but I have shown improved stapling mechanism for securing the bands, bottom, and sides together. The wire from which the staples are formed is fed from reels 163, carried by a frame $163^a$, projecting upwardly from the frame $1^a$. The wire passes between feed-rolls 164 and 165. There is a pair of rollers 164 165 for each wire. One of the wires leads to the staple-forming mechanism for the lower band, and the other wire leads to the staple-forming mechanism for the upper bands. The roller 165 is somewhat smaller than the roller 164, but they are geared together, and each one of the small rollers is supported by a lever 168, which is pivoted at $o$ and at its upper end connected to the bracket $1^b$ by a spring 169. The larger roller 164 is provided with ratchet-teeth engaged by a pawl $164^a$, held down by a weight $165^a$ and actuated by a reversely-curved lever 166. The rear end of this lever engages a cam 167 on the shaft of the same pinion $190^a$, which actuates the staple plungers or drivers hereinafter described. The weight $165^a$ is so shaped that when the pawl $164^a$ is raised sufficiently the weight rides up over a pin $164^b$, which projects laterally from the pawl, and by this means the pawl may be held out of engagement with the ratchet-teeth, and thus stop the feed of the wire when desired.

The stapling mechanism is most clearly shown in Figs. 8, 9, and 38 to 42, inclusive. The nailer-frame consists of two end pieces or castings 189, connected by a longitudinal bar 199 and a base-plate $199^a$. The nailer-frame is mounted on the main frame near the form, so that the staples may be driven at the proper places. Mounted on the bar 199 between the end castings is a frame 185, consisting of a sleeve $185^a$, which fits the bar 199 and is free to slide thereon, and end pieces $185^b$ and $185^c$, arranged a distance apart sufficient to accommodate certain mechanism hereinafter described. The sleeve carries a pin 300, to which is connected a pitman 197. The inner end of the pitman is jointed at 196 to a crank-arm 195 on a shaft 192, which carries a gear 194, meshing with a gear 193 on a shaft 192, carrying a pinion $190^a$, meshing with the teeth 190 of the main cam and gear wheel 1. The teeth 190 are interrupted at $190^\times$, as indicated in Fig. 3, so that the operation of the nailers is stopped while the basket is being ejected and the bottom, the first side, and the bands are being fed into position. The bar 199 is held to the outer casting 189 by a set-screw $189^a$. The bar 199 has a longitudinal groove $x$, into which extends a key or feather $x'$ on the frame 185. By this means the frame is free to slide longitudinally on the bar, but is prevented from turning thereon.

The reciprocating cutters N N' are secured to a frame $N^2$, which has a sleeve $n$, adapted to slide on the bar 199. The cutters are clamped in position by the clamp-blocks $n'$. The cutter-frame is reciprocated by means of a push-lever $N^3$, pivoted at $n^3$ to the frame 185. One arm of the lever is provided with a spring $n^4$, which moves the lever in such direction as to cause the toothed arm $n^5$ to engage with the cutter-frame, so that when the frame 185 moves inwardly the cutter-frame $N^2$ will be moved inward, and as the cutter-frame bears against the staple-formers the latter are also moved inward, as hereinafter described. The inward movement of the cutter-frame is, however, arrested by a block $N^4$, having an inclined surface which the inner end of the lever $N^3$ strikes before the frame 185 has completed its inward movement. By this arrangement the frame 185 is made to move for a time after the cutter-frame has stopped. The frame $N^2$ is prevented from turning on the bar 199 by a pin or key $n^{10}$, which extends into the slot $x$. The outward movement of the frame $N^2$ is limited by a pin $n^{11}$, arranged in the slot $x$.

Stationary cutters M M' are arranged in recesses in the inner casting 189 and clamped in place by clamping-plates $m^{10}$ $m^{11}$. The staple-forming bars 175 176 are arranged in recesses in the inner casting 189 and are adapted to reciprocate back and forth therein. They are suitably shaped, as shown in Figs. 37 to 42, inclusive, to form the staples in the manner indicated in Fig. 40. The staple-formers are bored longitudinally and through them reciprocate the drivers or plungers 177. Each driver is provided with an outer headed end 178, and between the head 178 and the outer end of the staple-former is interposed a spiral spring 179, placed slightly under compression. Each driver is also formed with a shoulder at $179^a$, which limits its inward movement relatively to the staple-former. The head 178 of each driver rests against the inner end of a plunger 180, which passes through the end pieces $185^b$ and $185^c$ of the frame 185 and while free to reciprocate in the frame is prevented from turning by means of a lug $180^x$, which slides in a groove $180^y$ in the end piece $185^b$. On each plunger 180, between the end pieces $185^b$ and $185^c$, are arranged two cams 181 and 182 and a spiral spring 184. The cam 181 is secured to the plunger 180, as indicated in Fig. 40. The cam 182 is loose on the plunger. The spring 184 is secured to both cams and when being secured is placed under compression by being turned or twisted. The arrangement is such that when the frame 185 is moved inward the plungers 180 are also moved inward and move inward the drivers 177. As will be seen from Fig. 38, for instance, the interlocking parts of the cams 181 182 are inclined. A backward pressure on the plunger 180 tends to move the cam 181 rearwardly. The inclined surfaces of this cam act upon the correspondingly-inclined surfaces of the cam 182 and cause this cam to turn in a direction opposed to the direction of the arrow in Fig. 38. This tends to wind up the spring and place it under greater compression. Correspondingly-increased inward pressure is thereby exerted on the plunger 180 and the parts connected therewith.

The shape of the staple-formers is clearly indicated in Figs. 41 and 42, being properly grooved to receive the wire and the staples when formed. The drivers are also shaped to conform to the interior of the staple-formers, as clearly indicated in the drawings, and the cutters are suitably formed to give sharp points to the staples. The benders 186 have inwardly-projecting ends $185^a$, projecting into and adapted to slide in slots $186^a$ in the staple-formers and about which the staples are formed, and they have long shanks, which are attached to clamps 187, pivoted at 188 to the outer casting 189. Springs 190 normally draw the benders inwardly. 302 indicates rests or supports for the inner ends of the benders. The wires W W' for forming the upper and lower staples are led through passages in the inner casting 189, as indicated in Fig. 37. When the benders are in the position indicated by full lines in Fig. 38, the frame 185 moves forward. At this time the lever $N^3$ is in engagement with the cutter-frame $N^2$, as indicated in Fig. 39, and the cutter-frame bears against the staple-formers 175 176. As the frame 185 moves forward the cutters N and the staple-formers are moved inward, proper lengths of wire are cut, and the staples are bent and received into the staple-formers. After the staples are bent the cutter-frame $N^2$ strikes against the curved portions 306 of the shanks 186 and moves the benders outward, as indicated by dotted lines in Fig. 38. At this time the lever $N^3$ is disengaged from the cutter-frame, and the inner movement of the cutters is stopped. The frame 185 continues to move inward and through the medium of the plungers 180 moves inward the drivers 177, which, through the medium of the springs 179, move the staple-formers to the work. When the staple-formers are arrested by the work, the springs 179 are put under compression, and then the drivers move inward relatively to the staple-formers and insert the staples.

It will be observed that the drivers are operated by the plungers 180, and these plungers move the drivers inward to the full extent until the shoulders $179^a$ bear against the outer ends of the staple-formers. When this occurs, the drivers have fully inserted the staples. The arrangement of springs and cams on the plungers 180 permits the plungers to stop moving inward with the frame 185— that is to say, when the inward movement of the plungers is arrested the outer part $185^c$ of the frame 185 still bears against the cams 182; but these cams are not secured to the plungers, and as these cams interlock in the manner indicated in Fig. 9 with the cams 181 and are connected by the springs 184 the cams 182 will turn on the plungers, and thus the springs 184 are given a torsional turn or twist, putting them under greater compression. As the cams 181 are secured to the plungers the tendency is to prevent the plungers 180 from moving inwardly, and, as it were, they are made to move outward relatively to the inward movement of the frame 185. By this arrangement a proper movement can be given to the staple formers and drivers at all times no matter what may be the distance of the work from the inner end of the nailer-frame, and the frame 185 may be allowed to move to the same extent at all times without being impeded by the long or short movement of the drivers and the staple-formers. The pressure exerted on the drivers by the springs 184 may be regulated in such manner as to be just sufficient to drive the staples into knots or hard wood before the shoulders $179^a$ come against the outer ends of the staple-formers. After the frame 185 has completed its inward movement and starts to move backward the pressure on the plunger 180 is relieved and the cams 181 182 and springs 184 assume their normal positions. The staple-formers are drawn outwardly by means of rods $175^a$, secured to them and which extend loosely through lugs 301 on the frame 185. At the outer ends of the rods are cross-pins $175^b$. When the frame 185 starts to move backward it carries with it the lever $N^3$, and as soon as the lugs 301 abut against the pins $175^b$ the staple-formers are moved outwardly and soon bear against the cutter-frame $N^2$, and this frame is pushed outwardly by the staple-formers until the frame 185 reaches its outward stroke, at which time the cutter-frame is arrested by means of the key $n^{10}$ and the pin $n^{11}$, before referred to. The position of the hooked end of the lever $N^3$ is such that the frame 185 has a movement independently of the cutter-frame when starting to move inward and also when starting to move outward. When the frame 185 is at the limit of its outstroke, the hooked end of the lever $N^3$ is a short distance behind the cutter-frame, so that the frame 185 moves a short distance inward before moving the cutter-frame, and during this time the staple-formers are moved inward (through the springs 179) sufficiently to cause them to seat the wires in the grooves o and clamp them against the benders before the cutters act. In this way the short lengths of wire severed by the cutters are prevented from being flipped out before they are bent. After this the lever $N^3$ engages the cutter-frame and the cutters act. Immediately after this the staples are formed and driven. In like manner when moving outward the frame 185, carrying the lever $N^3$, moves for a short distance before moving the cutter-frame and before the staple-formers come into contact with the cutter-frame. The outward movement of the cutter-frame is stopped by the key $n^{10}$ and pin $n^{11}$, before referred to. When the frame 185 has completed its outward movement, the parts are in the position shown in Fig. 39, ready to advance and form and drive new staples.

The ejector 170 is pivoted to the main frame and is connected to the rod 19 by a head-plate $171^a$, which carries a pin $172^b$, extending into an elongated slot $173^c$ in the ejector. The ejector is adapted to pass down through the form and push the basket off from it. Before the basket can leave the form the catch-hook 81, which caught and held the first side piece, must be turned downward, as indicated in dotted lines in Fig. 4, in order to allow the hook to pass through the crack between the side pieces. In its downward movement the ejector 170 strikes against the arm $81^a$ and the hook is given the proper movement to release it from the basket. The end of the ejector in its downward movement strikes against an obliquely-disposed plate 200, pivoted at 201 to the form and provided with a spring 202, which normally holds the plate upward, as indicated in Fig. 4. The spring also serves to hold downward another frame 205, which I call the "kicker," which is also pivoted at 201. This kicker is pressed upwardly by the table 32 when it is holding a bottom piece 10. When the table is moved away from the form and the ejector moves downwardly, the latter engages the plate 200 and presses it down, putting the spring 202 under compression. The continued movement of the ejector loosens the basket, and then the kicker moves downward with a quick movement, and the basket is thrown from the form out of the way of the crane, which immediately afterward comes back with a new bottom piece.

In Fig. 26 I have shown a modified way of operating the crane, the band-feeding mechanism, and the ejector. In this figure $10^a$ indicates the crane. Its shaft $10^c$ is secured to an arm 21, and this arm is connected by a rod 22 with a block 17, secured to the sliding rod 19, that reciprocates in bearing-blocks 20. The plunger 125, which moves the bands downward toward the form, is pivoted at $125^c$ to the frame. It is slotted at $125^b$, and in this slot is arranged a pin $125^c$, projecting from an arm $125^d$, secured to the rod 19. The ejector 170 is pivoted at $170^a$ and connected by a link $170^b$ with the block 17. The shafts 116 are geared together in the manner before described, and the long shaft $16^e$, similar to the one before described, is geared at $16^d$ with a mutilated gear $16^m$ on a shaft $16^n$, to which is attached an arm $16^o$, carried by a frame $16^p$. This frame is pivoted at $16^{10}$ to a disk $16^q$, the axis of which is in line with the axis of the shaft $16^n$. The lower part of the frame is adapted to slide between arms $x^{11}$, secured to the rod 19. As the rod reciprocates the frame $16^p$ is moved around the axis of the disk and the shaft $16^n$ is rotated to impart movement to the band-feeders. The operation of the several mechanisms for performing the duties of assembling the parts of the basket and securing them together has been described while describing the details of construction and operation of the separate parts of the machine.

Briefly stated, the operation of the entire machine is as follows: The magazines or reservoirs for the bottoms, sides, and bands are first stored with supplies, the wire is led from the reels to the staplers, and then the machine is started. The crane $10^a$ first seizes a bottom board from the bottom of the magazine 11 in the manner before stated and moves with it to a position under the form 39. Then the lever 33 operates to raise the table 32, and the bottom board 10 is attached to the spurs 38 of the form, the form being in the position relatively to the nailing-line indicated in Fig. 32. The first side piece is then fed to the form. The picker 75 descends into the sides-magazine $60^a$, picks up one side piece in the manner indicated in Fig. 7, lifts it, and turns and delivers it to the holder 61. The grippers then seize the side piece and slide along the guide-bar 161 and force the first side piece onto the form inside the hook 81. At the same time two bands are fed by the screws 110 and 111 and the parts connected therewith to the opposite sides of the first side piece in the manner indicated in Fig. 4 and a band is fed to the bottom of the form. Then the nailers operate to attach the three bands to the first side piece, after which the form moves from the position shown in Fig. 32 to that shown in Fig. 33. A new side piece is attached in the manner before described, and then the form is turned in the manner indicated in Fig. 34, a side piece being fed at the proper time and the nailers being properly operated to attach the new side piece to the bottom piece and to the bands already delivered to the form. In like manner new side pieces are fed and nailed as the form is being moved in the manner indicated in Figs. 32 to 35, inclusive. As soon as the form has arrived at its original position (indicated in Fig. 32) the basket is completed. Then the crane moves from under the form and proceeds to the bottoms-magazine to receive a new bottom piece. Then the hook 81 is withdrawn as the ejector 170 descends. The ejector first strikes the hinged board 200 and operates the kicker 205 to eject the basket, which is accomplished before the crane returns with a new bottom. The new bottom board is next applied, and the operation of constructing the basket proceeds.

I have described an automatic machine for constructing baskets; but I wish it understood that I do not limit myself to a machine wholly automatic, as many parts of the mechanism are novel, irrespective of their connection with other parts. The details of construction may be varied and the parts may be somewhat differently organized without departing from my invention.

I do not herein claim, broadly, the use of a screw for separating bands from a bunch and delivering them singly. Such subject-matter is claimed in my application filed June 12, 1897, Serial No. 640,537. I also show and claim in said application a vertically-arranged screw which engages with the bands in a bunch and feeds them to a chute, through which they are delivered by a plunger to a form. In said application I also claim a disk of substantially the same formation as that shown in Figs. 16 and 17 in the present case in connection with the feed-screw.

In my application filed September 15, 1898, Serial No. 691,030, I also show a screw for separating bands from a bunch and delivering them singly to a discharge-opening, through which they are driven by a plunger and received by devices carried by a form.

My claims in the present case are confined, so far as the band-feeding mechanism is concerned, to features shown in the present case and not shown in said prior applications.

I claim as my invention—

1. The combination of a form, a pivoted hook adapted to receive and hold a side piece fed to the form, an ejector for ejecting the finished basket, means coacting with the ejector for turning the hook to release the basket, and means for retracting the hook to its former position.

2. The combination of a form, a hook having a shank pivoted in the form and having a rotary and longitudinal movement, an ejector adapted to enter the form, and means coacting with the ejector to turn the shank and hook.

3. The combination of a form, a kicker-frame hinged thereto, a spring attached to the kicker-frame, an ejector acting on the spring to place it under tension, a table opposite the kicker-frame, and means for removing the table to allow the spring to actuate the kicker-frame.

4. The combination of a form, a swinging crane for delivering bottoms to the form, and a bottoms-magazine yieldingly hinged or pivoted to the frame of the machine whereby it may turn out of the way of the crane, should the crane improperly operate.

5. The combination with a frame of a basket-machine of a bottoms-magazine provided with a bar hinged to the frame, and having an arm secured to it, provided with a slot through which extends a bolt attached to the frame, the arrangement being such that the position of the bottoms-magazine may be adjusted and the magazine allowed to turn out of the way when subjected to abnormal pressure.

6. The combination of a form, a bottoms-magazine, a crane provided with movable jaws, a spring for drawing the jaws together, a hook pivoted to the frame, near the pivot of the crane, a spring for drawing the hook toward the crane to cause the hook to engage with the jaws and hold them open, and a stop for releasing the hook from the jaws.

7. The combination of a form, a kicker-frame hinged thereto, a hinged plate above the kicker-frame, means for operating the plate and a spring interposed between the hinged plate and the kicker-frame.

8. The combination with the frame of a basket-machine, of a sides-magazine provided with upright trough-shaped frame-plates, means for adjusting the frame-plates toward and from each other, means for adjusting the sides-magazine vertically, and means for tilting it.

9. In a basket-making machine, the combination with a sides-magazine, of a picker, means for moving the picker into the magazine to receive a side piece therefrom, and means for moving the picker away from the magazine more slowly than it moved toward it.

10. In a basket-making machine the combination of a sides-magazine, a picker, means for moving the picker rapidly into the sides-magazine to receive a side piece therefrom, and means for moving the picker away from the magazine more slowly than it moved into it.

11. In a basket-making machine, the combination of a sides-magazine, a reciprocating picker adapted to enter the magazine to extract a side piece therefrom, and means for varying the speed of the picker whereby it is made to travel rapidly toward the magazine, and more slowly away from it.

12. In a basket-making machine, the combination with a sides-magazine, of a reciprocating picker-arm, driving mechanism and gearing, including elliptical gears for driving the picker with a differential speed.

13. In a basket-making machine, the combination with a sides-magazine, of a picker, means for moving the picker into the magazine to receive a side piece therefrom, and means for moving the picker away from the magazine at a differential speed, i. e., at first slowly and then more rapidly.

14. In a basket-making machine, the combination with a sides-magazine, of a picker, means for moving the picker away from the magazine at a differential speed, namely, slowly at first and then more rapidly, and means for moving the picker toward the magazine at a higher speed than it receded from it.

15. The combination of a picker, a shaft on which it is mounted, a crank-shaft, a crank-arm on the picker-shaft, a rod connecting this crank-arm with the crank-shaft, and elliptical gears for driving the crank-shaft.

16. The combination of a picker-arm, a frame in which it is mounted and adapted to turn, a rock-shaft on which the frame is mounted, a spring for connecting the picker-frame with the rock-shaft, and gearing for turning the picker-arm while it is being oscillated by the rock-shaft.

17. The combination of the picker-arm, a frame in which it is mounted, a rock-shaft on which the frame is mounted, a lug on the shaft for moving the picker-frame in one direction, a spring secured to the rock-shaft for moving the frame in the opposite direction, and gearing for turning the picker-arm while it is being oscillated.

18. The combination of a hinged side-piece holder, means for adjusting the movement of the holder on its hinge, and means for automatically changing the position of the holder when feeding successive sides.

19. In a basket-making machine, the combination of a sides-magazine, a form, a side-piece holder, a picker for taking side pieces from the magazine and delivering them directly to the holder, and means for at times tilting the holder.

20. In a basket-making machine, the combination of a sides-magazine, a form, a side-piece holder, means for delivering side pieces to the holder, means for at times tilting the holder, and means engaging the side pieces after they have been tilted and carrying them to the form.

21. In a basket-making machine, the combination of a sides-magazine, a form, a side-piece holder, means for delivering side pieces to the holder, a gripper, means for tilting the side-piece holder before the side pieces are engaged by the gripper, and means for then causing the gripper to engage the side piece and carry it to the form.

22. The combination of a form, means for moving it and turning it, a side-piece holder, a clamp for holding side pieces in the holder, means for at times tilting the holder, means for delivering side pieces to the holder, and means for moving side pieces therefrom to the form.

23. The combination of a side-piece holder, a clamp for holding the side pieces therein, a picker for delivering side pieces to the holder, means for turning the clamp out of the way of the picker while the latter is delivering side pieces to the holder.

24. In a basket-making machine, the combination of a form, a support for two bunches of bands, feed-screws for separating the bands and delivering them singly, a chute to which the bands are delivered, and a plunger for moving the bands through the chute toward the form.

25. The combination of a form, a support for two piles of bands, screws engaging the bands and acting to separate and deliver them singly from the piles, a chute below the screws divided into two parts, and a plunger for moving the bands through the chute.

26. The combination of a form, a support for a bunch of bands, a pivoted lever having on its inner end a holder for the end of a band and which receives the band and carries it to the form, which is moved downwardly by the band, and means for returning the lever to its original position when the band has been drawn through the holder.

27. The combination of a form, a support for a bunch of bands, a chute between the form and the holder for the bunch of bands, means for delivering bands singly through the chute, and a lever having a hooked holder for the bands delivered through the chute which is moved downwardly by the bands and holds them while being wound around the form, and means for returning the hooked end of the lever to its normal position after the band has been withdrawn.

28. The combination of a form, holders for the inner ends of two piles of bands above the form, a chute between the form and the holders divided into two parts, screws engaging the piles of bands, and separating them, and delivering them singly to the chute, and a plunger operating on both bands to deliver them to the form.

29. The combination of a form, supports for the inner ends of two piles of bands above the form, a chute between the supports and the form divided into two parts, a plate between which and the form one of the bands is delivered, a holder which supports the other band and through which the band is drawn while being wrapped around the form for the other band, and a plunger for delivering one of the bands inside the plate next to the form, and the other band into the holder.

30. The combination of a form, a support for a bunch of bands, a plunger for separating a band from the bunch and delivering it to the form, and a spring-hook parallel with the plunger for limiting or controlling the movement of the band while being delivered to the form.

31. In a basket-making machine, the combination of a nailer-frame, a frame mounted to slide therein, a staple-former, a staple-driver adapted to reciprocate within the staple-former, means for supplying wire from which the staples are made, means for cutting lengths of wire for the staples, a plunger bearing against the outer end of the driver, a spring interposed between the driver and the staple-former, a cam fixed to the plunger, another cam loose on the plunger and having surfaces interlocking with the first-mentioned cam but adapted to turn on the plunger, and a spring encircling the cams secured at one end to the fixed cam and at the other end to the movable cam, the arrangement being such that the loose cam may move longitudinally on the plunger relatively to the fixed cam and may also turn relatively to the fixed cam, thereby winding and unwinding the spring.

32. The combination of a nailer-frame, a staple-former, a driver reciprocating in the staple-former, a spring interposed between the staple-former and the driver, a plunger, a spring connected with the plunger, means for moving the plunger forward and devices connecting the spring with the plunger constructed and arranged to twist or turn the spring to increase its pressure while the plunger is moving inward.

33. The combination of a form, a crane, a pivoted arm on which the crane is carried, a rod connected to said arm, a reciprocating cross-head to which the rod is pivoted, and a yielding connection interposed between the rod and the cross-head for the purpose specified.

34. A support for the outer end of a bunch of bands, comprising a frame, a U-shaped hanger, suspended therefrom, and a cross-piece on which the bands rest above the lower end of the U-shaped hanger to permit the bands to turn from a horizontal into a vertical position as they are delivered.

In testimony that I claim the foregoing as my invention I have signed my name, in presence of two witnesses, this 23d day of June, 1898.

EMMET HORTON.

Witnesses:
EUGENE DIVEN,
HARRIET MITCHELL.